US012680823B2

(12) United States Patent
Larsson et al.

(10) Patent No.: US 12,680,823 B2
(45) Date of Patent: Jul. 14, 2026

(54) AUTOMATED BREAK LOCATION RECOMMENDATION

(71) Applicant: QUALCOMM Incorporated, San Diego, CA (US)

(72) Inventors: Annika Larsson, Gothenburg (SE); Shabin Mahadevan, Lake Orion, MI (US); Rachel Gray Alexander, Chicago, IL (US)

(73) Assignee: QUALCOMM Incorporated, San Diego, CA (US)

( * ) Notice: Subject to any disclaimer, the term of this patent is extended or adjusted under 35 U.S.C. 154(b) by 209 days.

(21) Appl. No.: 18/453,631

(22) Filed: Aug. 22, 2023

(65) Prior Publication Data

US 2025/0067569 A1     Feb. 27, 2025

(51) Int. Cl.
*G01C 21/34*     (2006.01)
*H04W 4/024*     (2018.01)
*H04W 4/48*     (2018.01)

(52) U.S. Cl.
CPC ..... *G01C 21/3484* (2013.01); *G01C 21/3476* (2013.01); *H04W 4/024* (2018.02); *H04W 4/48* (2018.02)

(58) Field of Classification Search
CPC ........................ G01C 21/3484; G01C 21/3476; G01C 21/26; G01C 21/3617; G01C 21/362; G01C 21/3644; H04W 4/024; H04W 4/48; H04W 4/025
See application file for complete search history.

(56) References Cited

U.S. PATENT DOCUMENTS

| | | | | |
|---|---|---|---|---|
| 6,401,029 | B1 * | 6/2002 | Kubota .............. | G01C 21/3611 |
| | | | | 701/538 |
| 9,704,392 | B2 * | 7/2017 | Wang ................... | G08G 1/0112 |
| 11,511,757 | B2 * | 11/2022 | Zijderveld ........... | G05D 1/0291 |
| 12,055,404 | B2 * | 8/2024 | Lang .................... | G01C 21/362 |
| 12,158,346 | B1 * | 12/2024 | Choudhary ............ | G06Q 50/40 |
| 2016/0012726 | A1 | 1/2016 | Wang | |
| 2016/0104486 | A1 | 4/2016 | Penilla et al. | |
| 2019/0311014 | A1 * | 10/2019 | Sugawara .......... | G01C 21/3617 |
| 2021/0201212 | A1 * | 7/2021 | Tang ...................... | G06Q 50/40 |
| 2021/0339759 | A1 | 11/2021 | Fouad et al. | |
| 2022/0230227 | A1 * | 7/2022 | Fan .................... | G01C 21/3694 |
| 2022/0357172 | A1 | 11/2022 | Lang et al. | |
| 2023/0078143 | A1 | 3/2023 | Ghanbari et al. | |

OTHER PUBLICATIONS

International Search Report and Written Opinion—PCT/US2024/036440—ISA/EPO—Oct. 1, 2024.

* cited by examiner

*Primary Examiner* — Ramon A. Mercado
*Assistant Examiner* — Noah W Stiebritz
(74) *Attorney, Agent, or Firm* — Thien T. Nguyen

(57)     ABSTRACT

Aspects presented herein may enable a server to recommend break/stop locations (or filter out unrecommended break/stop locations) for occupant(s) of a vehicle (e.g., the driver and his/her passenger(s)) based on where people with similar occupants in their vehicles are taking breaks. In one aspect, a server receives, from a user equipment (UE), first information related to a set of occupants in a vehicle and at least one feature for at least one occupant in the set of occupants. The server calculates, based on the first information, a probability that a route for the vehicle includes a set of target locations. The server selects at least one target location based on the first information. The server transmits, to the UE, an indication of the selected at least one target location.

28 Claims, 15 Drawing Sheets

$\Phi$ = Azimuth angle of departure (A-AoD)
$\theta$ = Zenith angle of departure (Z-AoD)
$\rho$ = Distance
$\Phi'$ = Azimuth angle of arrival (A-AoA)
$\theta'$ = Zenith angle of arrival (Z-AoA)

1000

1002

Receive, from a user equipment (UE), first information related to a set of occupants in a vehicle and at least one feature for at least one occupant in the set of occupants

1010

Select at least one target location based on the first information

1012

Transmit, to the UE, an indication of the selected at least one target location

1100

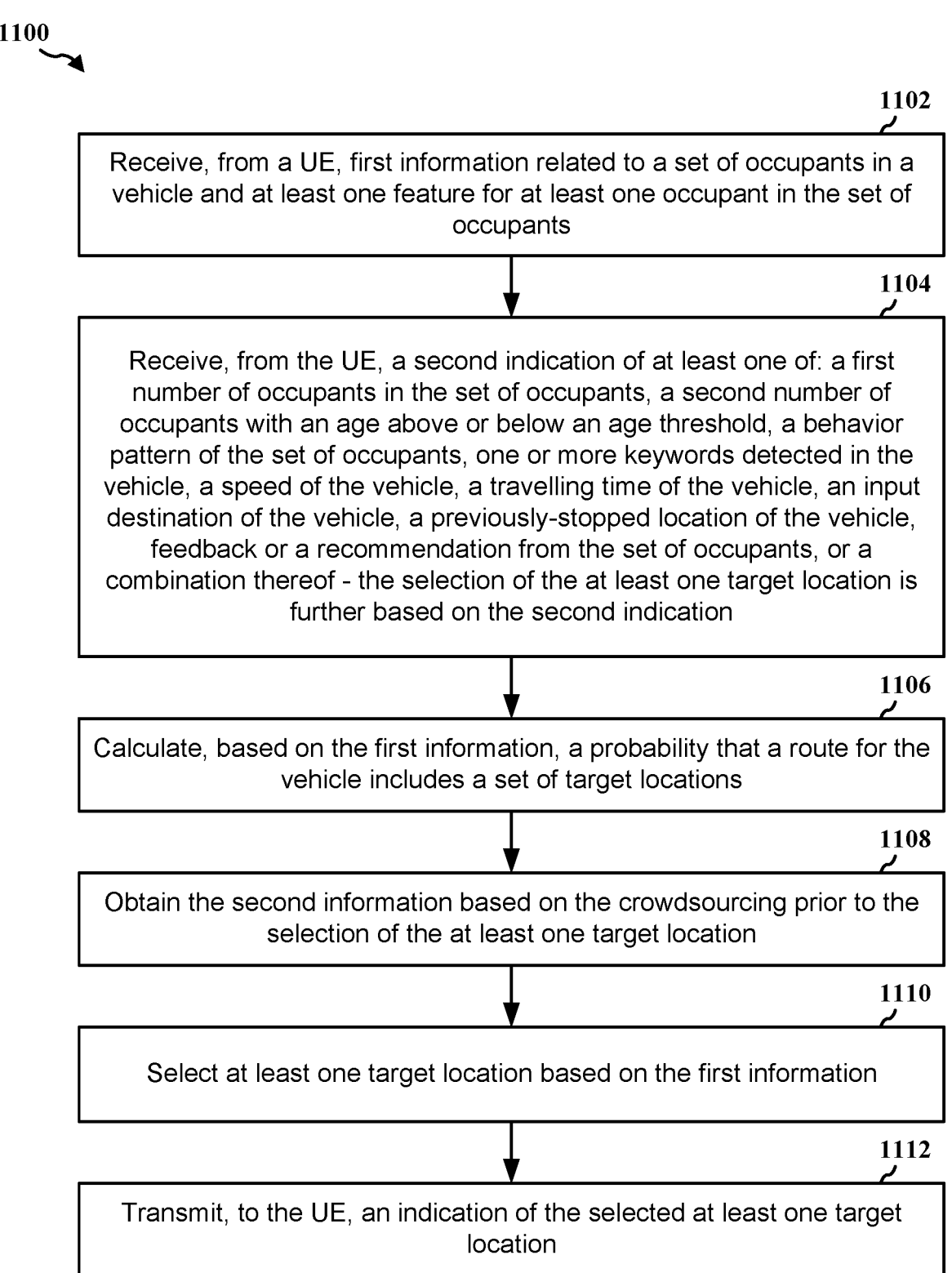

1102

Receive, from a UE, first information related to a set of occupants in a vehicle and at least one feature for at least one occupant in the set of occupants

1104

Receive, from the UE, a second indication of at least one of: a first number of occupants in the set of occupants, a second number of occupants with an age above or below an age threshold, a behavior pattern of the set of occupants, one or more keywords detected in the vehicle, a speed of the vehicle, a travelling time of the vehicle, an input destination of the vehicle, a previously-stopped location of the vehicle, feedback or a recommendation from the set of occupants, or a combination thereof - the selection of the at least one target location is further based on the second indication

1106

Calculate, based on the first information, a probability that a route for the vehicle includes a set of target locations

1108

Obtain the second information based on the crowdsourcing prior to the selection of the at least one target location

1110

Select at least one target location based on the first information

1112

Transmit, to the UE, an indication of the selected at least one target location

Transmit, to a server, first information related to a set of occupants in a vehicle and at least one feature for at least one occupant in the set of occupants

1308

Receive, from the server, an indication of at least one target location in a set of target locations based on the first information and based on second information from crowdsourcing

1400

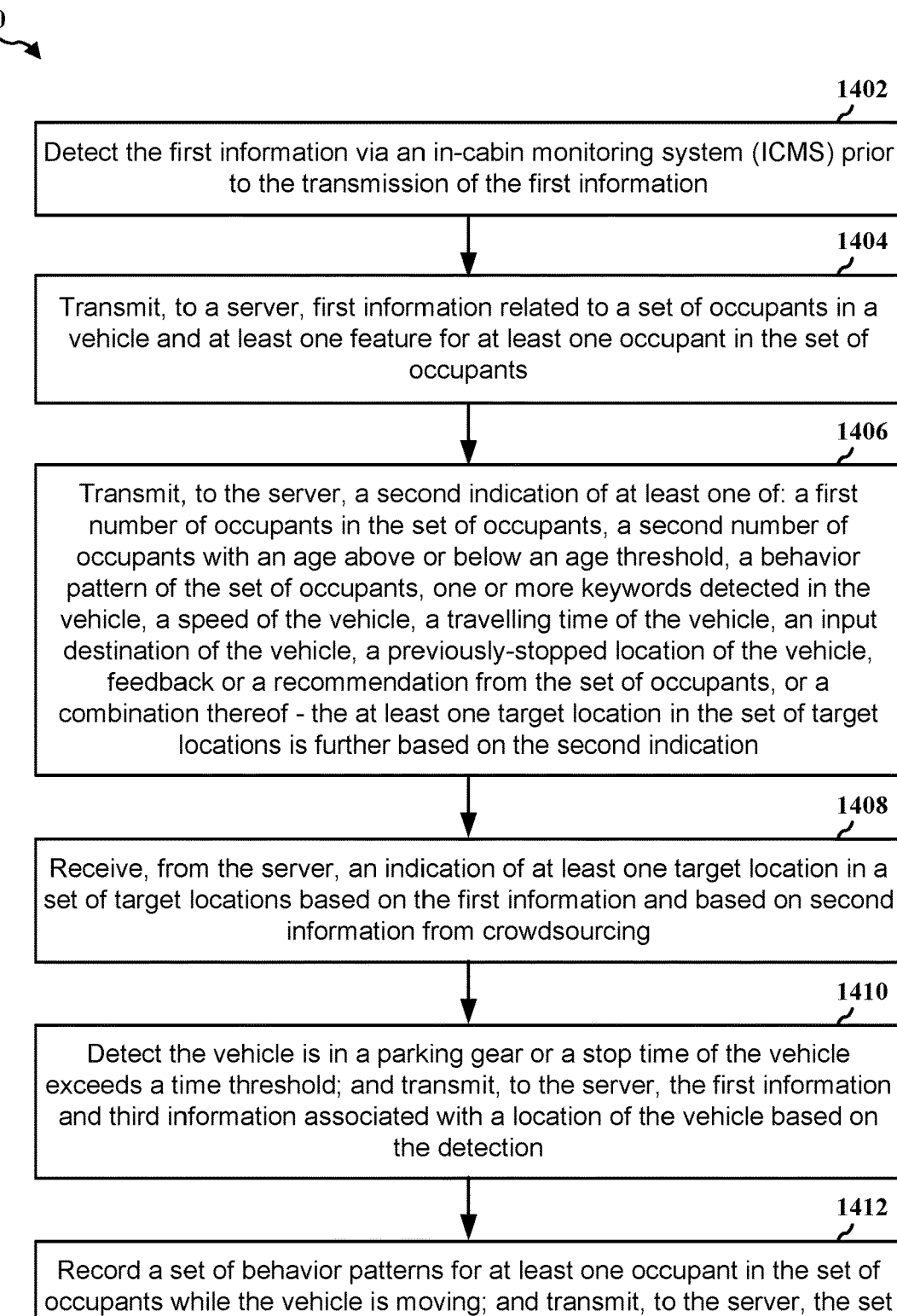

1402

Detect the first information via an in-cabin monitoring system (ICMS) prior to the transmission of the first information

1404

Transmit, to a server, first information related to a set of occupants in a vehicle and at least one feature for at least one occupant in the set of occupants

1406

Transmit, to the server, a second indication of at least one of: a first number of occupants in the set of occupants, a second number of occupants with an age above or below an age threshold, a behavior pattern of the set of occupants, one or more keywords detected in the vehicle, a speed of the vehicle, a travelling time of the vehicle, an input destination of the vehicle, a previously-stopped location of the vehicle, feedback or a recommendation from the set of occupants, or a combination thereof - the at least one target location in the set of target locations is further based on the second indication

1408

Receive, from the server, an indication of at least one target location in a set of target locations based on the first information and based on second information from crowdsourcing

1410

Detect the vehicle is in a parking gear or a stop time of the vehicle exceeds a time threshold; and transmit, to the server, the first information and third information associated with a location of the vehicle based on the detection

1412

Record a set of behavior patterns for at least one occupant in the set of occupants while the vehicle is moving; and transmit, to the server, the set of behavior patterns based on detecting the vehicle is in a parking gear or a stop time of the vehicle exceeds a time threshold

FIG. 14

AUTOMATED BREAK LOCATION RECOMMENDATION

TECHNICAL FIELD

The present disclosure relates generally to communication systems, and more particularly, to a wireless communication involving navigation.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

In some scenarios, drivers may be specified to take one or more breaks during a long drive. However, areas suitable for taking the breaks may be different when the driving involves with different occupants (e.g., with kids/elders, alone, and/or with pets, etc.). While certain applications may provide recommended stop areas based on a user's request or input (e.g., the user asks for stop area recommendations via a travelling/navigation application), these applications typically just provide a list of possible stops on a route/trip, which may be hard for a driver to decide which stop area(s) to choose (especially when the driver is driving). Aspects presented herein may improve the road safety for drivers and their passengers by providing drivers and/or their passengers with automated break location recommendations.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus receives, from a user equipment (UE), first information related to a set of occupants in a vehicle and at least one feature for at least one occupant in the set of occupants. The apparatus selects at least one target location based on the first information. The apparatus transmits, to the UE, an indication of the selected at least one target location.

In an aspect of the disclosure, a method, a computer-readable medium, and an apparatus are provided. The apparatus transmits, to a server, first information related to a set of occupants in a vehicle and at least one feature for at least one occupant in the set of occupants. The apparatus receives, from the server, an indication of at least one target location in a set of target locations based on the first information and based on second information from crowdsourcing.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 11 is a flowchart of a method of wireless communication.

FIG. 14 is a flowchart of a method of wireless communication.

DETAILED DESCRIPTION

Figure 1:
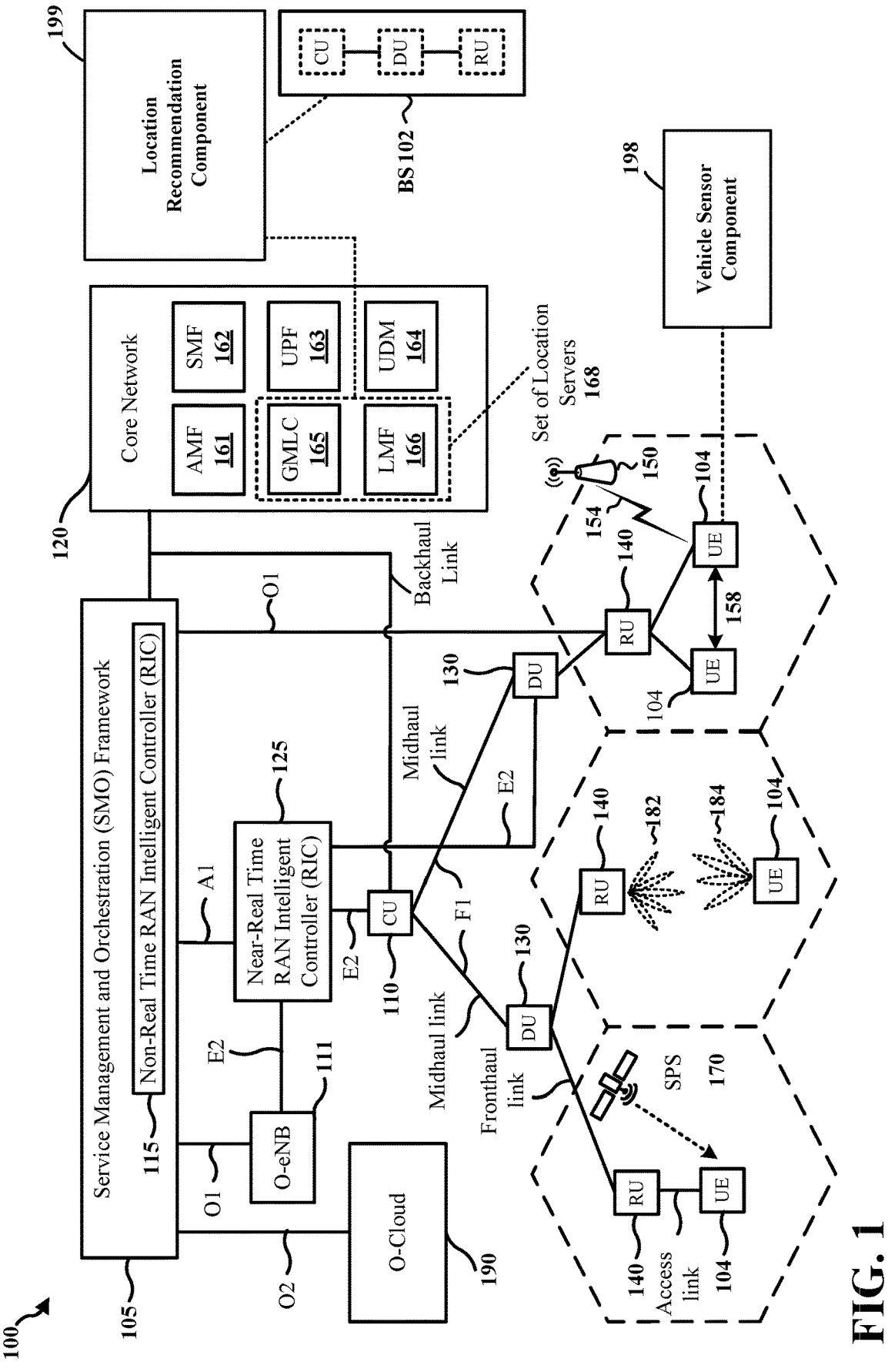
FIG. 1 is a diagram illustrating an example of a wireless communications system and an access network.

Aspects presented herein may improve the road safety for drivers and their passengers by providing drivers and/or their passengers with automated break location recommendations. For example, a filter may be added/implemented to an in-vehicle navigation system (e.g., an on-board unit (OBU)) or a device (e.g., a smartphone) running a navigation application, where the filter may recommend break locations (or filter out unrecommended break locations) for a driver based on where people with similar occupants in their cars are taking breaks. Aspects presented herein may offer drivers/users with a personalized navigation experience, customized to the specific needs of their vehicle occupants by sharing the thinking and decision making of drivers. Aspects presented herein may also enable users to input their favored options for type(s) of break(s) in the navigation (e.g., fastest route, most scenic route, most peaceful or remote route, appropriate for dog walks route, etc.), and the users may be provided/offered with stop redocumentations/options that best fit to or are most suitable for their needs and desires.

Aspects presented herein are directed to techniques for providing recommendations for break points along travel routes based on crowdsourcing information. The proposed solution may contain the following aspects: 1) crowdsourcing various kinds of data including: location of stops, duration of stops, number of occupants, number of children, pets, etc. 2) Provide break point recommendations based on various criteria that potentially match or correspond to crowdsourced data: travel route, anticipated time of travel, user profile and favored options, information regarding occupants (e.g., number of adults, number of pets, number of kids, etc.), behaviors of occupants indicating that a stop may be needed). 3) Refine/adapt recommendations based on user feedback and information collected during and after the recommended break point, etc.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU. DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to $Y$ MHz (e.g., 5, 10, 15, 20, 100, 400, etc. MHz) bandwidth per carrier allocated in a carrier aggregation of up to a total of $Yx$ MHz ($x$ component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF)

166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a vehicle sensor component 198 that may be configured to transmit, to a server, first information related to a set of occupants in a vehicle and at least one feature for at least one occupant in the set of occupants; and receive, from the server, an indication of at least one target location in a set of target locations based on the first information and based on second information from crowdsourcing. In certain aspects, the base station 102 or the one or more location servers 168 may have a location recommendation component 199 that may be configured to receive, from a UE, first information related to a set of occupants in a vehicle and at least one feature for at least one occupant in the set of occupants; calculate, based on the first information, a probability that a route for the vehicle includes a set of target locations; select at least one target location based on the first information; and transmit, to the UE, an indication of the selected at least one target location.

Figures 2A, 2B, 2C, 2D:
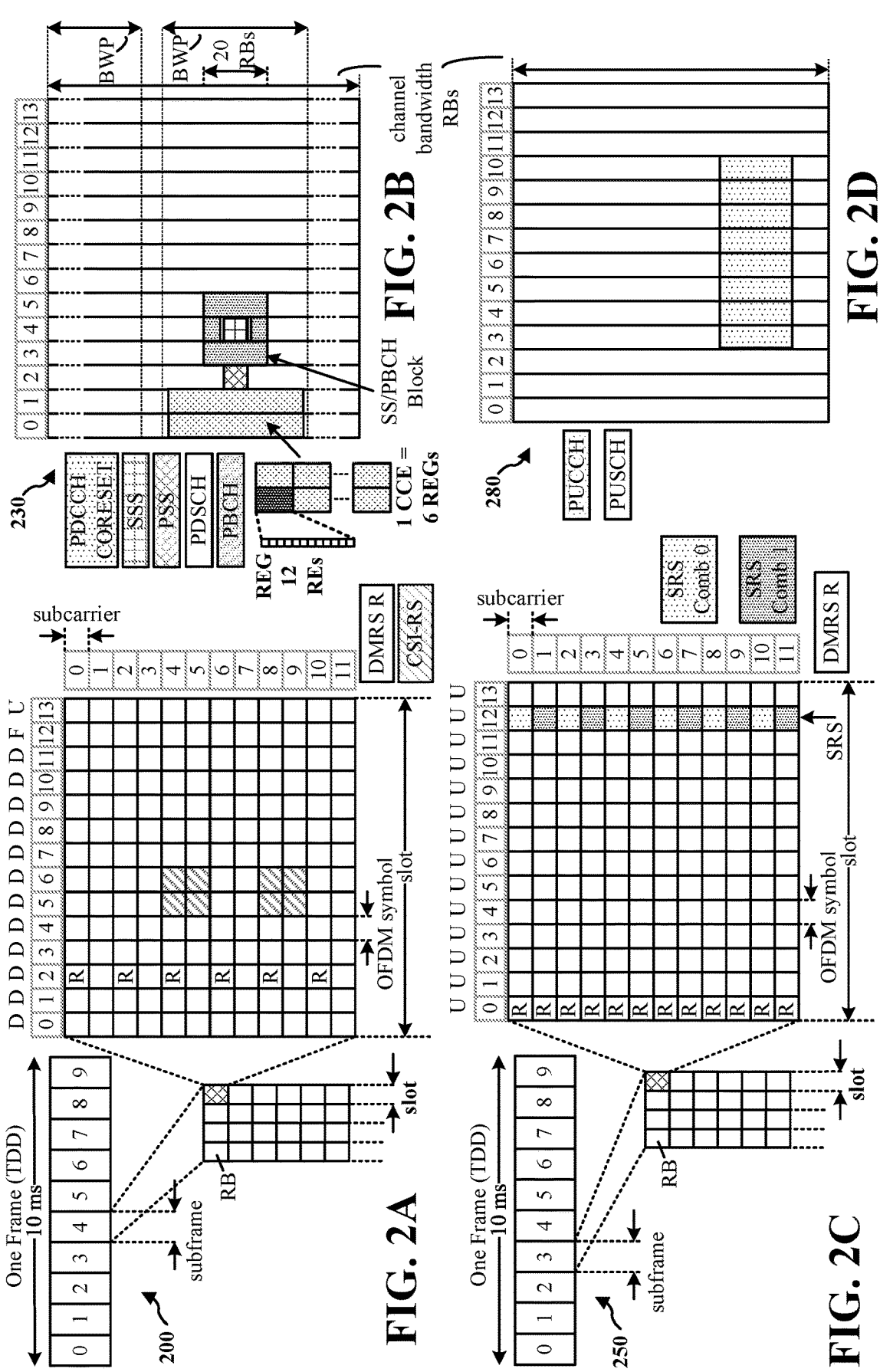
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15$[kHz] | Cyclic prefix |
|---|---|---|
| 0 | 15 | Normal |
| 1 | 30 | Normal |
| 2 | 60 | Normal, Extended |

TABLE 1-continued

Numerology, SCS, and CP

| μ | SCS $\Delta f = 2^\mu \cdot 15$[kHz] | Cyclic prefix |
|---|---|---|
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and 24 slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
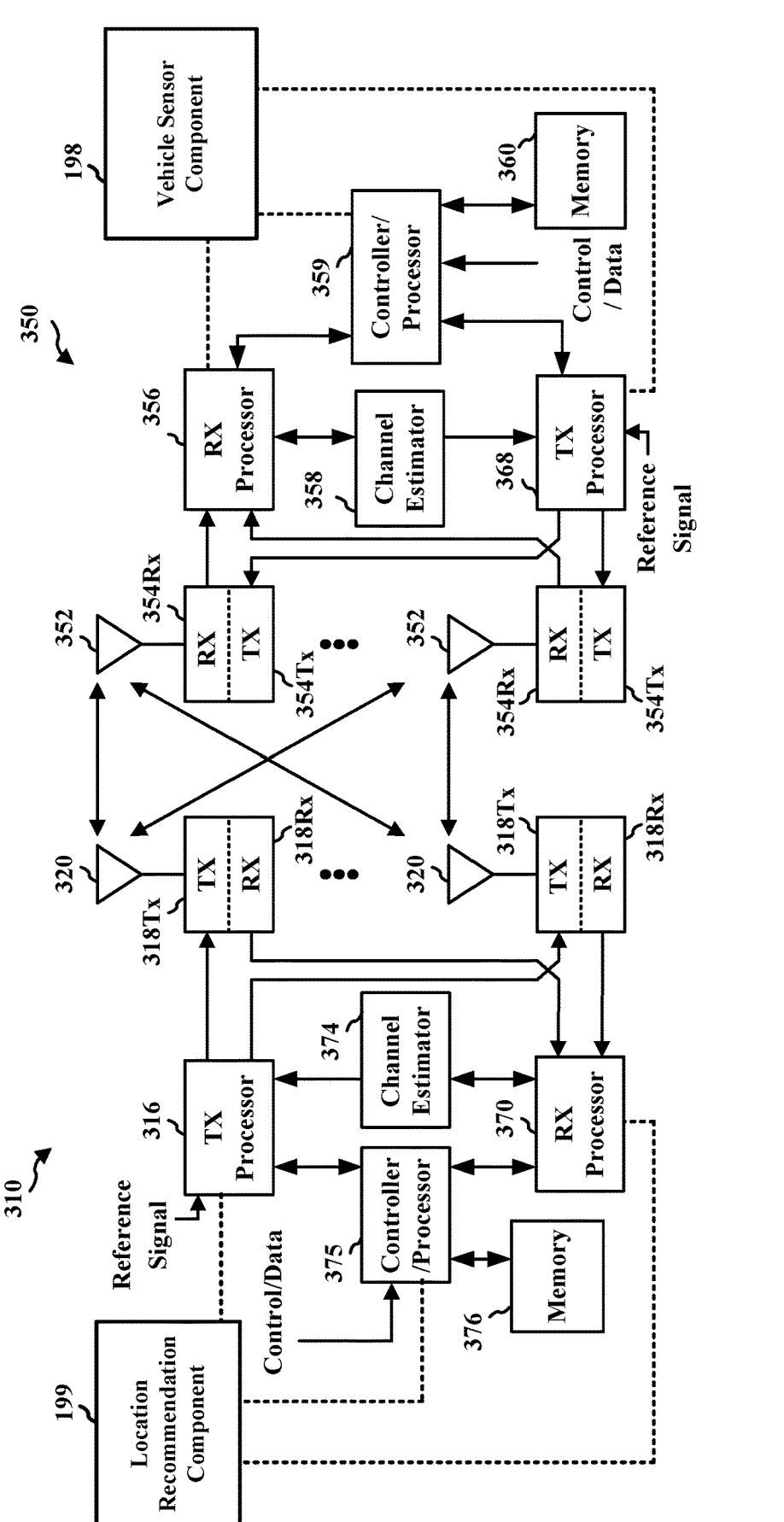
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the vehicle sensor component 198 of FIG. 1.

At least one of the TX processor 316, the RX processor 370, and the controller/processor 375 may be configured to perform aspects in connection with the location recommendation component 199 of FIG. 1.

Figure 4:
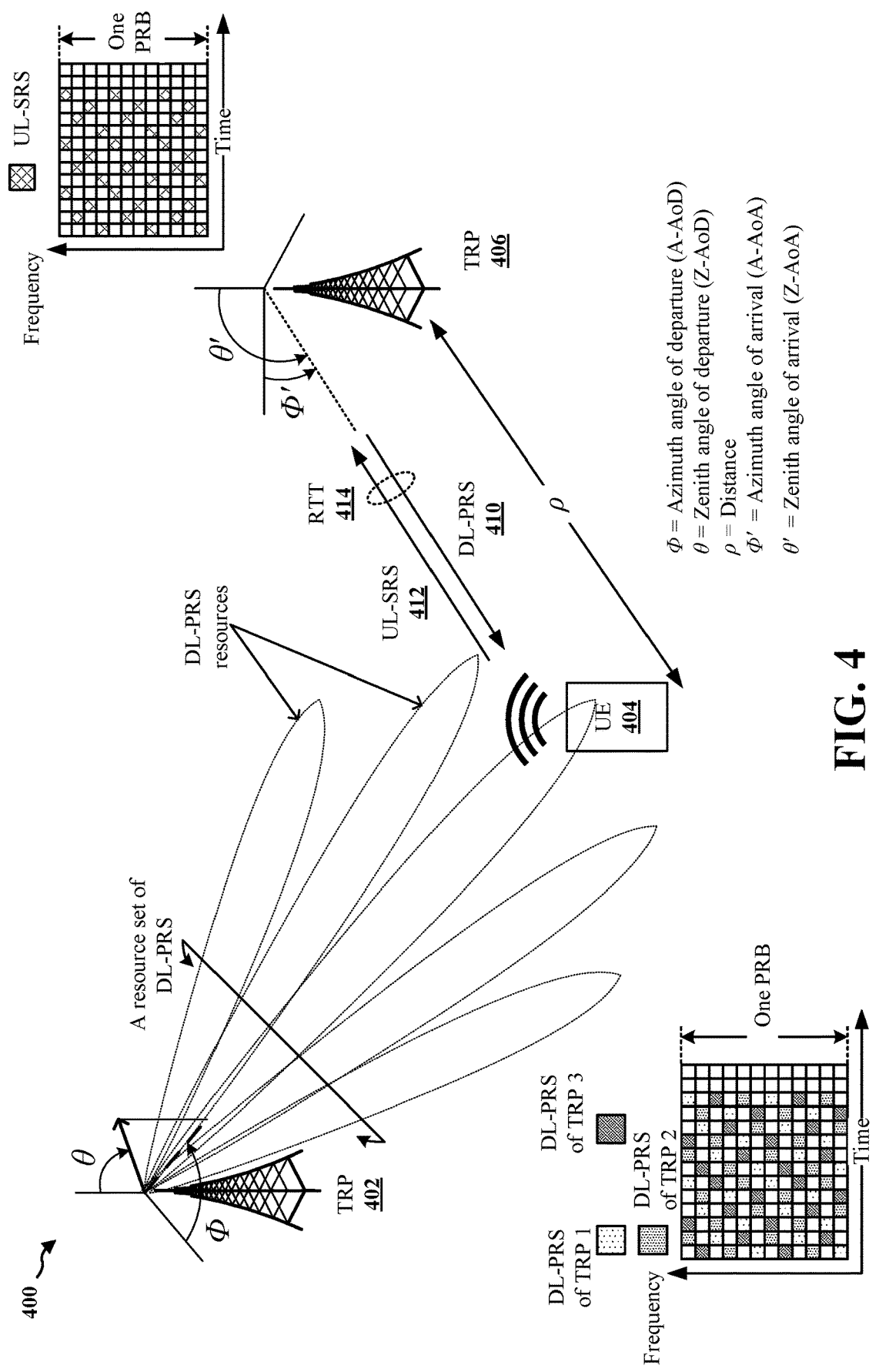
FIG. 4 is a diagram illustrating an example of a UE positioning based on reference signal measurements.

FIG. 4 is a diagram 400 illustrating an example of a UE positioning based on reference signal measurements (which may also be referred to as "network-based positioning") in accordance with various aspects of the present disclosure. The UE 404 may transmit UL SRS 412 at time $T_{SRS\_TX}$ and receive DL positioning reference signals (PRS) (DL PRS) 410 at time $T_{PRS\_RX}$. The TRP 406 may receive the UL SRS 412 at time $T_{SRS\_RX}$ and transmit the DL PRS 410 at time $T_{PRS\_TX}$. The UE 404 may receive the DL PRS 410 before transmitting the UL SRS 412, or may transmit the UL SRS 412 before receiving the DL PRS 410. In both cases, a positioning server (e.g., location server(s) 168) or the UE 404 may determine the RTT 414 based on $\|T_{SRS\_RX} - T_{PRS\_TX}\| - |T_{SRS\_TX} - T_{PRS\_RX}\|$. Accordingly, multi-RTT positioning may make use of the UE Rx–Tx time difference measurements (i.e., $|T_{SRS\_TX} - T_{PRS\_RX}|$) and DL PRS reference signal received power (RSRP) (DL PRS-RSRP) of downlink signals received from multiple TRPs 402, 406 and measured by the UE 404, and the measured TRP Rx–Tx time difference measurements (i.e., $|T_{SRS\_RX} - T_{PRS\_TX}|$) and UL SRS-RSRP at multiple TRPs 402, 406 of uplink signals transmitted from UE 404. The UE 404 measures the UE Rx–Tx time difference measurements (and/or DL PRS-RSRP of the received signals) using assistance data received from the positioning server, and the TRPs 402, 406 measure the gNB Rx–Tx time difference measurements (and/or UL SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

PRSs may be defined for network-based positioning (e.g., NR positioning) to enable UEs to detect and measure more neighbor transmission and reception points (TRPs), where multiple configurations are supported to enable a variety of deployments (e.g., indoor, outdoor, sub-6, mmW, etc.). To support PRS beam operation, beam sweeping may also be configured for PRS. The UL positioning reference signal may be based on sounding reference signals (SRSs) with enhancements/adjustments for positioning purposes. In some examples, UL-PRS may be referred to as "SRS for positioning," and a new Information Element (IE) may be configured for SRS for positioning in RRC signaling.

DL PRS-RSRP may be defined as the linear average over the power contributions (in [W]) of the resource elements of the antenna port(s) that carry DL PRS reference signals configured for RSRP measurements within the considered measurement frequency bandwidth. In some examples, for FR1, the reference point for the DL PRS-RSRP may be the antenna connector of the UE. For FR2, DL PRS-RSRP may be measured based on the combined signal from antenna elements corresponding to a given receiver branch. For FR1 and FR2, if receiver diversity is in use by the UE, the reported DL PRS-RSRP value may not be lower than the corresponding DL PRS-RSRP of any of the individual receiver branches. Similarly, UL SRS-RSRP may be defined as linear average of the power contributions (in [W]) of the resource elements carrying sounding reference signals (SRS). UL SRS-RSRP may be measured over the configured resource elements within the considered measurement frequency bandwidth in the configured measurement time occasions. In some examples, for FR1, the reference point for the UL SRS-RSRP may be the antenna connector of the base station (e.g., gNB). For FR2, UL SRS-RSRP may be measured based on the combined signal from antenna elements corresponding to a given receiver branch. For FR1 and FR2, if receiver diversity is in use by the base station, the reported UL SRS-RSRP value may not be lower than the corresponding UL SRS-RSRP of any of the individual receiver branches.

PRS-path RSRP (PRS-RSRPP) may be defined as the power of the linear average of the channel response at the i-th path delay of the resource elements that carry DL PRS signal configured for the measurement, where DL PRS-RSRPP for the 1st path delay is the power contribution corresponding to the first detected path in time. In some examples, PRS path Phase measurement may refer to the phase associated with an i-th path of the channel derived using a PRS resource.

DL-AoD positioning may make use of the measured DL PRS-RSRP of downlink signals received from multiple TRPs 402, 406 at the UE 404. The UE 404 measures the DL PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and/or DL PRS-RSRP) of downlink signals received from multiple TRPs 402, 406 at the UE 404. The UE 404 measures the DL RSTD (and/or DL PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and/or UL SRS-RSRP) at multiple TRPs 402, 406 of uplink signals transmitted from UE 404. The TRPs 402, 406 measure the UL-RTOA (and/or UL SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404. For purposes of the present disclosure, a positioning operation in which measurements are provided by a UE to a base station/positioning entity/server to be used in the computation of the UE's position may be described as "UE-assisted," "UE-assisted positioning," and/or "UE-assisted position calculation," while a positioning operation in which a UE measures and computes its own position may be described as "UE-based," "UE-based positioning," and/or "UE-based position calculation."

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. To further distinguish the type of PRS, a downlink positioning reference signal may be referred to as a "DL PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS." In addition, the term "location" and "position" may be used interchangeably throughout the specification, which may refer to a particular geographical or a relative place.

Figure 5:
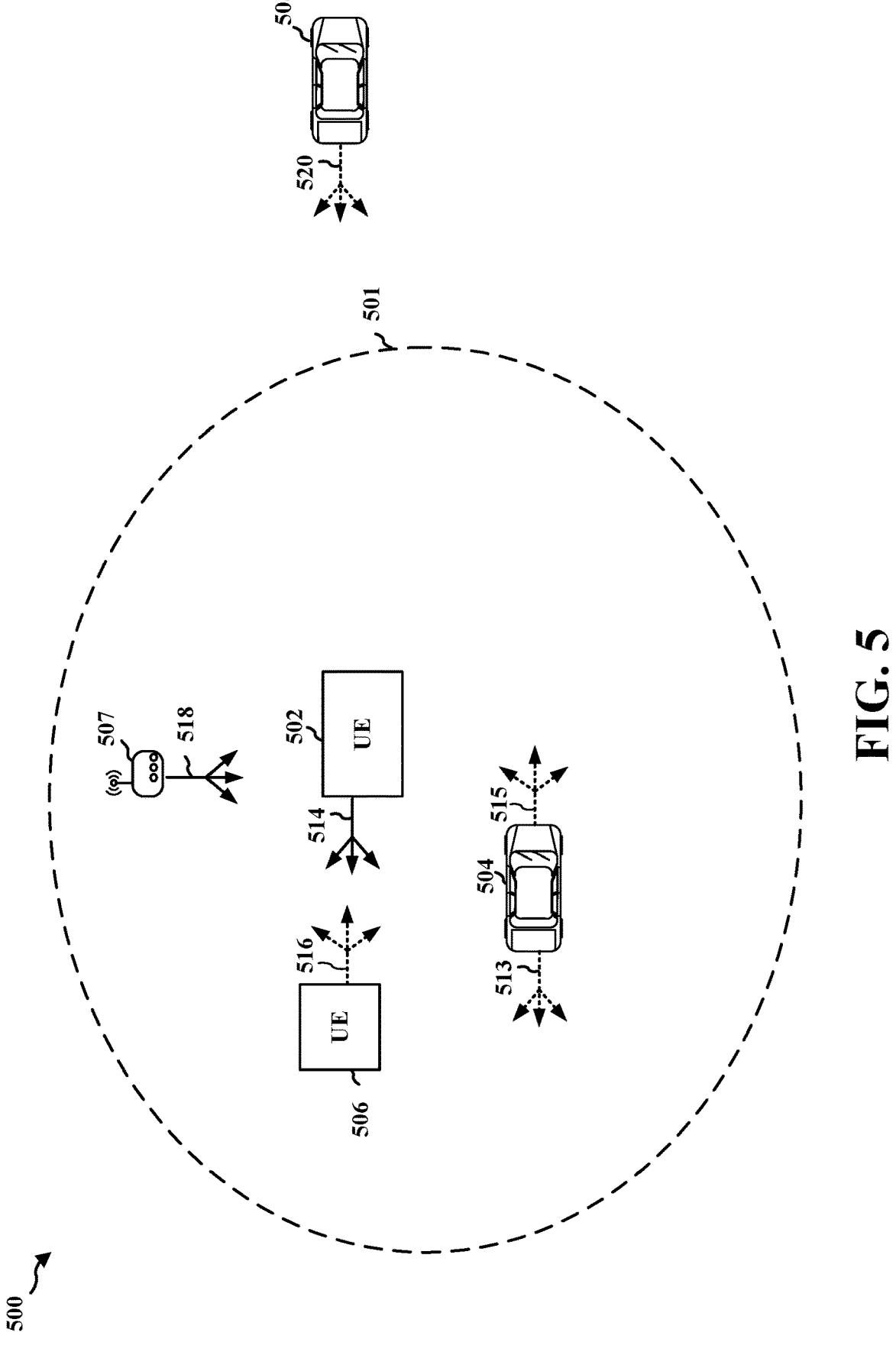
FIG. 5 is a diagram illustrating an example of sidelink communication between devices.

FIG. 5 illustrates an example 500 of sidelink communication between devices. The communication may be based on a slot structure similar to aspects described in connection with FIGS. 2A to 2D. For example, the UE 502 may transmit a sidelink transmission 514, e.g., including a control channel (e.g., PSCCH) and/or a corresponding data channel (e.g., PSSCH), that may be received by UEs 504, 506, 508. A control channel may include information (e.g., sidelink control information (SCI)) for decoding the data channel including reservation information, such as information about time and/or frequency resources that are reserved for the data channel transmission. For example, the SCI may indicate a number of TTIs, as well as the RBs that may be occupied by the data transmission. The SCI may be used by receiving devices to avoid interference by refraining from transmitting on the reserved resources. The UEs 502, 504, 506, 508 may each be capable of sidelink transmission in addition to sidelink reception. Thus, UEs 504, 506, 508 are illustrated as transmitting sidelink transmissions 513, 515, 516, 520. The sidelink transmissions 513, 514, 515, 516, 520 may be unicast, broadcast or multicast to nearby devices. For example, UE 504 may transmit sidelink transmissions 513, 515 intended for receipt by other UEs within a range 501 of UE 504, and UE 506 may transmit sidelink transmission 516. Additionally, or alternatively, RSU 507 may receive communication from and/or transmit communication transmission 518 to UEs 502, 504, 506, 508. One or more of the UEs 502, 504, 506, 508 or the RSU 507 may include a vehicle sensor component 198 and/or a location recommendation component 199 as described in connection with FIG. 1.

Sidelink communication may be based on one or more transmission modes. In one transmission mode for a first radio access technologies (RAT) (which may be referred to herein as "Mode 4" of a first RAT), a wireless device may autonomously select resources for transmission. A network entity may allocate one or more sub-channels for wireless devices to transmit one or more transport blocks (TB) using the one or more channels. A wireless device may randomly reserve an allocated resource for one-shot transmissions. A wireless device may use a sensing-based semi-persistent transmission scheme, or semi-persistent scheduling (SPS) mode, to select a reserved resource for transmission. For example, before selecting a resource for data transmission, a wireless device may first determine whether resources have been reserved by another wireless device. Semi-persistent transmission allows a wireless device to take advantage of semi-periodic traffic arrival by using historical interference patterns to predict future interference patterns. The wireless device may sense at least one of priority information, energy sensing information, or PSCCH decoding information to optimize resource selection. In one aspect, a wireless device may avoid selecting resources for a transmission that are scheduled to be used for a higher priority packet transmission. In another aspect, a wireless device may rank resources according to how much energy is received, and may pick the lowest energy resources. In another aspect, a wireless device may avoid resources for whom control is decoded or for which the received energy may be above a threshold.

A network entity may configure the periodicity of the reserved sub-channels using DCI transmitted over a PDCCH. The period of a semi-persistent transmission resource may be, for example, 20, 50, 100, 200, 300, 400, 500, 600, 700, 800, 900, or 1000 milliseconds (ms). Such a periodicity may be referred to as a resource reservation period (RSVP). In alternative embodiments, the periodicity may be referred to as a resource reservation interval (RRI). A network entity may limit the possible values for the periodicity of the transmission resource. A wireless device, such as a UE, may select a transmission resource based on the periodicity of an arrival packet. A counter may be used to trigger periodic reselections. For example, a wireless device may randomly select a counter between 5 and 15, and may reserve a resource based on the counter (e.g., 10*counter resource reservation periods, a number of MAC protocol data unit (PDU) transmissions equal to the counter). After every transmission, or after a reservation period passes, the counter may be decremented until it hits zero. For example, where a reservation period is 100 ms and a counter is 10, every 100 ms the counter may decrement until one second(s) passes, upon which the wireless device may then reselect a sidelink resource. In one aspect, the wireless device may reselect the sidelink resource based on a re-selection probability value. For example, in response to the counter decrementing to zero, the wireless device may reselect the sidelink resource an x % of the time, and may not reselect the sidelink resource (1−x) % of the time, where x<1. The wireless device may then reset the counter and repeat the process when the counter decrements to zero again. A wireless device may measure a received signal strength indicator (RSSI) measurement for each slot of 100 ms, and may then calculate the RSSI of the frequency band resource as an average of each of the 10 RSSI measurements taken over the period of one second. A wireless device may select a suitable frequency band resource as a resource that is in one of the bottom 20% of ranked RSSI calculated resources for a wireless device. In some aspects, the counter may be decremented after every MAC PDU transmission. A wireless device may be configured to reselect a sidelink resource after a counter expires (i.e., reaches zero), and a MAC PDU is received.

Sidelink communication for other RATs may be based on different types or modes of resource allocation mechanisms. In another resource allocation mode for a second RAT (which may be referred to herein as "Mode 1" of a second RAT), centralized resource allocation may be provided by a network entity. For example, a network entity may determine resources for sidelink communication and may allocate resources to different wireless devices to use for sidelink transmissions. In this first mode, a wireless device may receive an allocation of sidelink resources from a base station. In a second resource allocation mode (which may be referred to herein as "Mode 2"), distributed resource allocation may be provided. In Mode 2, each wireless device may autonomously determine resources to use for sidelink transmission. In order to coordinate the selection of sidelink resources by individual wireless devices, each wireless device may use a sensing technique to monitor for resource reservations by other sidelink wireless devices and may select resources for sidelink transmissions from unreserved resources. Devices communicating based on sidelink, may determine one or more radio resources in the time and frequency domain that are used by other devices in order to select transmission resources that avoid collisions with other devices.

The sidelink transmission and/or the resource reservation may be periodic or aperiodic, where a wireless device may reserve resources for transmission in a current slot and up to two future slots (discussed below).

Thus, in the second mode (e.g., Mode 2), individual wireless devices may autonomously select resources for sidelink transmission, e.g., without a central entity such as a base station indicating the resources for the device. A first wireless device may reserve the selected resources in order to inform other wireless devices about the resources that the first wireless device intends to use for sidelink transmission(s).

In some examples, the resource selection for sidelink communication may be based on a sensing-based mechanism. For instance, before selecting a resource for a data transmission, a wireless device may previously determine whether resources have been reserved by other wireless devices.

For example, as part of a sensing mechanism for a resource allocation mode 2 of a second RAT, a wireless device may determine (e.g., sense) whether a selected sidelink resource has been reserved by other wireless device(s) before selecting a sidelink resource for a data transmission. If the wireless device determines that the sidelink resource has not been reserved by other wireless devices, the wireless device may use the selected sidelink resource for transmitting the data, e.g., in a PSSCH transmission. The wireless device may estimate or determine which radio resources (e.g., sidelink resources) may be in-use and/or reserved by others by detecting and decoding sidelink control information (SCI) transmitted by other wireless devices. The wireless device may use a sensing-based resource selection algorithm to estimate or determine which radio resources are in-use and/or reserved by others. The wireless device may receive SCI from another wireless device that may include reservation information based on a resource reservation field in the SCI. The wireless device may continuously monitor for (e.g., sense) and decode SCI from peer wireless devices. The SCI may include reservation information, e.g., indicating slots and RBs that a particular wireless device has selected for a future transmission. The wireless device may exclude resources that are used and/or reserved by other wireless devices from a set of candidate resources for sidelink transmission by the wireless device, and the wireless device may select/reserve resources for a sidelink transmission from the resources that are unused and therefore form the set of candidate resources. A wireless device may continuously perform sensing for SCI with resource reservations in order to maintain a set of candidate resources from which the wireless device may select one or more resources for a sidelink transmission. Once the wireless device selects a candidate resource, the wireless device may transmit SCI indicating its own reservation of the resource for a sidelink transmission. The number of resources (e.g., sub-channels per subframe) reserved by the wireless device may depend on the size of data to be transmitted by the wireless device. Although the example is described for a wireless device receiving reservations from another wireless device, the reservations may be received from an RSU or other device communicating based on sidelink.

In some examples, a software or an application that accepts positioning related measurements from global navigation satellite system (GNSS)/global positioning system (GPS) chipsets and/or sensors to estimate position, velocity, and/or altitude of a device may be referred to as a positioning engine (PE). In addition, a positioning engine that is capable of achieving certain high level of accuracy (e.g., centimeter/decimeter level accuracy) and/or latency may be referred to as a precise positioning engine (PPE). On the other hand, a navigation application may refer to an application in a user equipment (e.g., a smartphone, an in-vehicle navigation system, a GPS device, etc.) that is capable of providing navigational directions in real time. Over the last few years, users have increasingly relied on navigation applications because they have provided various benefits. For example, navigation applications may provide convenience to users as they enable users to find a way to their destinations, and also allow users to contribute information and mark places of importance thereby generating the most accurate description of a location. In some examples, navigation applications are also capable of providing expert guidance for users, where a navigation application may guide a user to a destination via the best, most direct, or most time-saving routes. For example, a navigation application may obtain the current status of traffic, and then locate a shortest and fastest way for a user to reach a destination, and also provide approximately how long it will take the user to reach the destination. As such, a navigation application may use an Internet connection and a GPS/GNSS navigation system to provide turn-by-turn guided instructions on how to arrive at a given destination.

Figure 6:
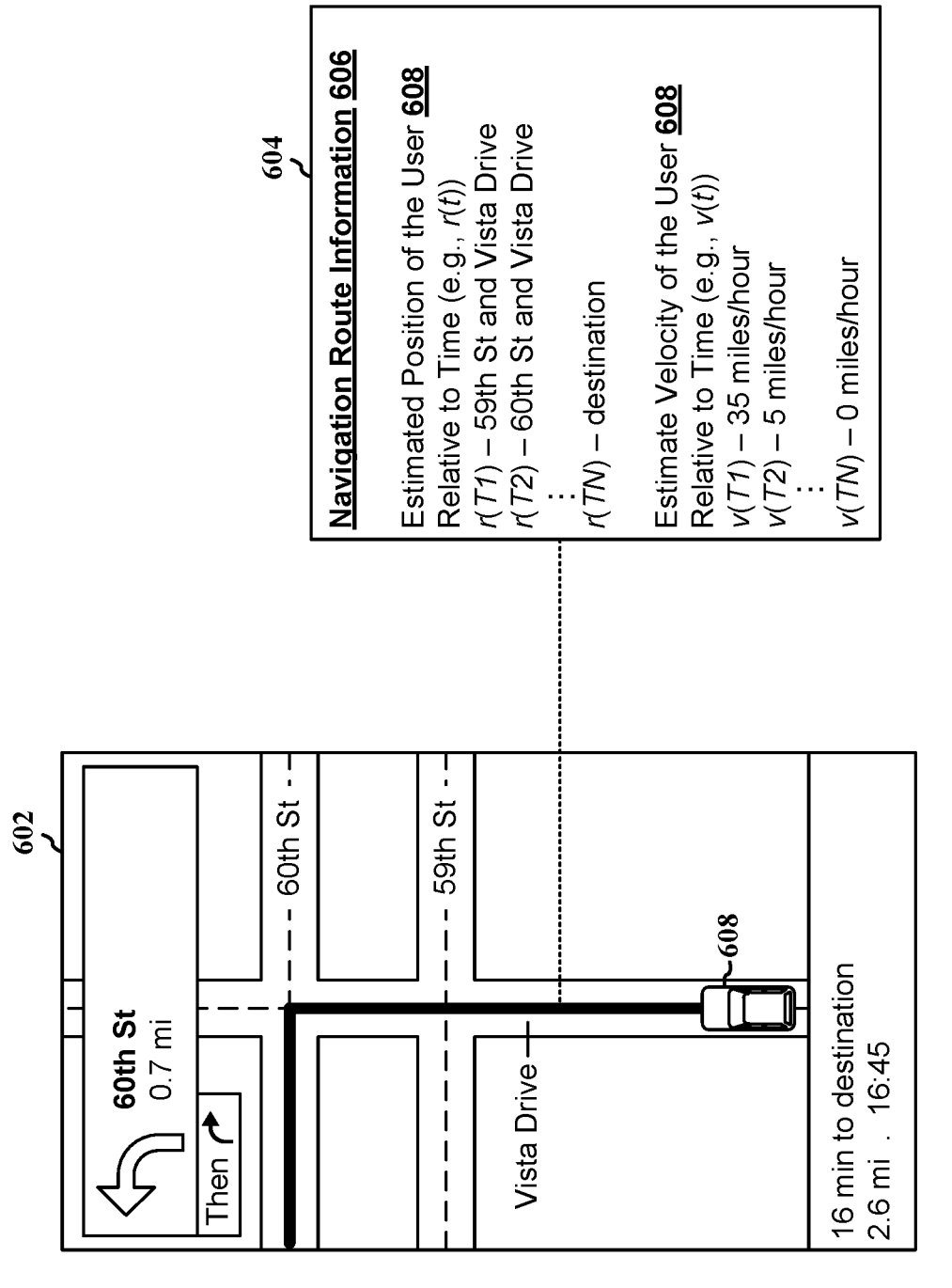
FIG. 6 is a diagram illustrating an example of a navigation application in accordance with various aspects of the present disclosure.

FIG. 6 is a diagram 600 illustrating an example of a navigation application in accordance with various aspects of the present disclosure. As shown at 602, a navigation application, which may be running on a UE such as a vehicle (e.g., a built-in GPS/GNSS system of the vehicle) or a smartphone, may provide a user (e.g., via a display or an interface) with turn-by-turn directions to a destination and an estimated time to reach the destination based on real-time information. For example, the navigation application may receive/download real-time traffic information, road condition information, local traffic rules (e.g., speed limits), and/or map information/data from a server. Then, the navigation application may calculate a route to the destination based on at least the map information and other available information. The map information may include the map of the area in which the user is traveling, such as the streets, buildings, and/or terrains of the area, or a map that is compatible with the navigation application and GPS/GNSS system. In some examples, the route calculated by the navigation application may be the shortest or the fastest route. For purposes of the present disclosure, information associated with this calculated route may be referred to as navigation route information. For example, navigation route information may include predicted/estimated positions, velocities, accelerations, directions, and/or altitudes of the user at different points in time.

For example, as shown at 604, based on the map information, the speed limit, and the real-time road condition information, the navigation application may generate navigation route information 606 that guides a user 608 to a destination. In some examples, the navigation route information 606 may include the position of the user and velocity of the user relative/respect to time, which may be denoted as $\vec{r}(t)$ and $\vec{v}(t)$, respectively. For example, the navigation application may estimate that at a first point in time (T1), the user may reach a first point/place with certain speed (e.g., the intersection of 59th Street and Vista Drive with a velocity of 35 miles per hour), and at a second point in time (T2), the user may reach a second point/place with certain speed (e.g., the intersection of 60th Street and Vista Drive with a velocity of 15 miles per hour), and up to $N^{th}$ point in time (TN), etc.

During a long drive (e.g., a long-distance driving, a driving that exceeds a pre-defined range, etc.), it may be important for drivers to take regular breaks to ensure the drivers and their passenger(s)' safety and minimize fatigue. The frequency for drivers to take a break may depend on several factors, such as driving conditions, personal comfort, and/or legal conditions, etc. These breaks may typically last for about 15 to 30 minutes, allowing the drivers to rest, stretch their legs, use the restroom, and refresh themselves, etc. Long periods of uninterrupted driving may lead to driver fatigue, which may impair drivers' judgment, reaction time, and overall driving ability. As such, taking regular breaks helps prevent fatigue and also provides drivers with an opportunity to stay alert and focus on the road, reducing the risk of accidents. However, in some scenarios, when a driver is driving in not very well-known areas (during a long drive), taking a break may not be easy or may be tricky. For example, the driver may not realize a break is necessary until it is quite late, and the nearest rest area is quite a distance away. In another example, the driver may not know where to stop, and/or whether the upcoming stop(s)/rest area(s) are suitable for certain purposes (e.g., whether there are nice areas for a walk, playgrounds for kids, and/or grassy lands for pets, etc.).

While taking a break during a long drive may be necessary, areas suitable for taking the breaks may be different when the driving involves with different occupants (e.g., with kids/elders, alone, and/or with pets, etc.). While certain applications may provide recommended stop areas based on a user's request or input (e.g., the user asks for stop area recommendations via a travelling/navigation application), these applications typically just provide a list of possible stops on a route/trip, which may be hard for a driver to decide which stop area(s) to choose (especially when the driver is driving).

Aspects presented herein may improve the road safety for drivers and their passengers by providing drivers and/or their passengers with automated break location recommendations. For example, a filter may be added/implemented to an in-vehicle navigation system or a device (e.g., a smartphone) running a navigation application, where the filter may recommend break locations (or filter out unrecommended break locations) for a driver based on where people with similar occupants in their cars as the driver are taking breaks. Aspects presented herein may offer drivers/users with a personalized navigation experience, customized to the specific needs of their vehicle occupants by sharing the thinking and decision making of drivers. Aspects presented herein may also enable users to input their favored options for type(s) of break(s) in the navigation (e.g., fastest route, most scenic route, most peaceful or remote route, appropriate for dog walks route, etc.), and the users may be provided/offered with stop redocumentations/options that best fit to or are most suitable for their needs and desires.

Figure 7:
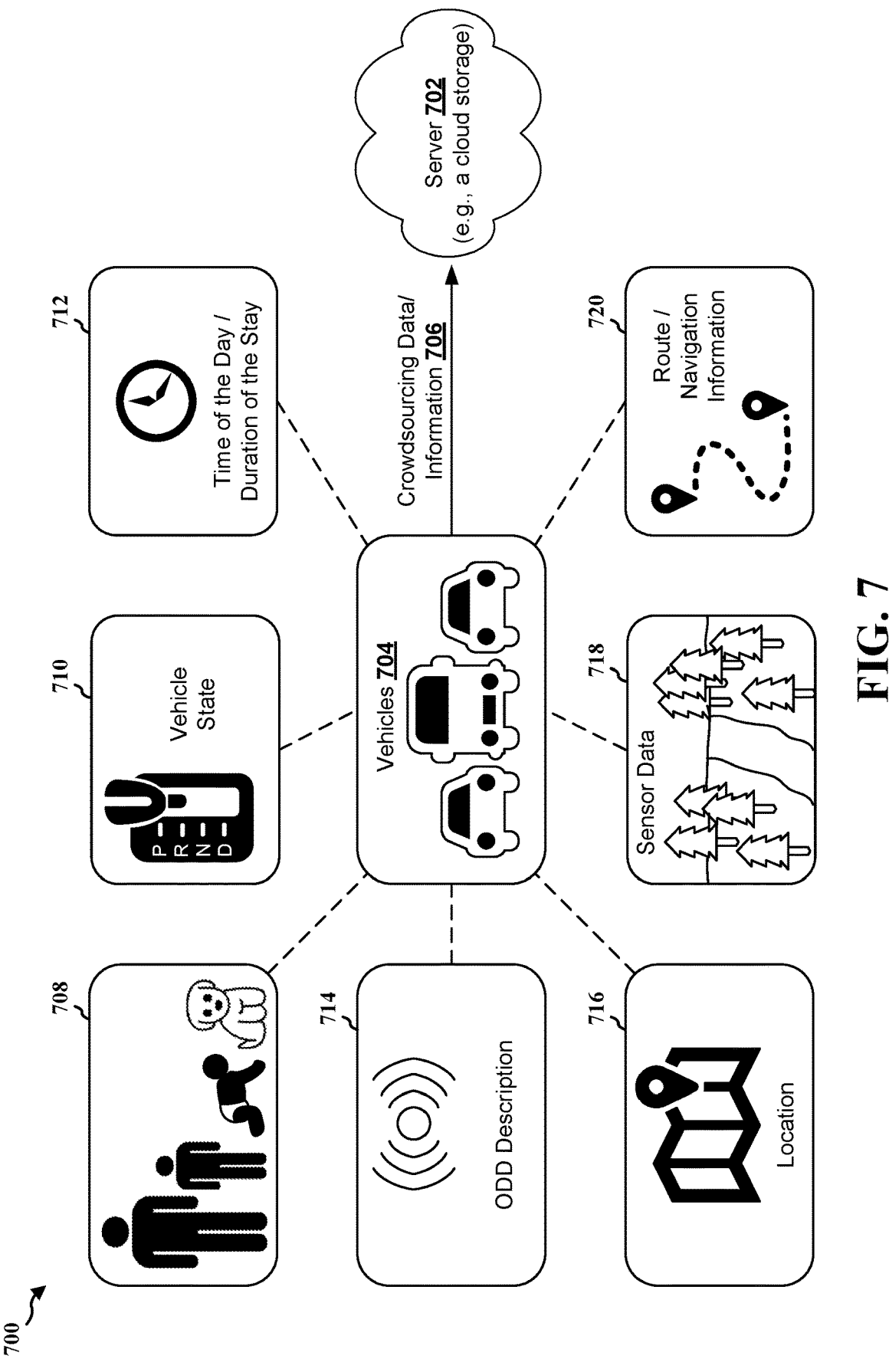
FIG. 7 is a diagram illustrating an example of a server collecting information from a plurality of vehicles for providing automated break location recommendations in accordance with various aspects of the present disclosure.

FIG. 7 is a diagram 700 illustrating an example of a server collecting information from a plurality of vehicles for providing automated break location recommendations in accordance with various aspects of the present disclosure. In one aspect of the present disclosure, a server 702 (e.g., a location server, a cloud server, a cloud storage, etc.) may be configured to perform crowdsourcing of the data/information (which may be referred to as "crowdsourcing data/information" or "crowdsourced data/information") related to vehicles and locations where they stop, such as by collecting crowdsourcing data/information 706 from a set of vehicles 704 that are not moving (e.g., vehicles that shift to the parking gear, vehicles that are not moving for a duration exceeding a threshold, etc.).

For purposes of the present disclosure, crowdsourcing may refer to a mechanism for collecting information (e.g., the "crowdsourcing data/information") from a group of entities (e.g., UEs, vehicles, devices, etc.), usually via an online server. For example, crowdsourcing may involve obtaining data from a group of UEs/vehicles, where the group of UEs/vehicles may submit the data to a crowdsourcing server or an Internet platform (e.g., social medias, mobile applications, etc.). Based on the data collected from the group of UEs/vehicles, the crowdsourcing server may aggregate the data, analyze the data, and determine which set(s) of data may be useful or has a good credibility to other devices. For example, a crowdsourcing server may collect weather conditions reported by a group of UEs/vehicles within a region in real time. Based on the weather conditions received from the group of UEs/vehicles, the crowdsourcing server may be able to determine the current weather condition at that region, and the crowdsourcing server may share such information (e.g., the determined current weather condition) with other UEs/vehicles (e.g., UEs/vehicles that are in proximity to the region or moving towards the region). In some examples, "crowdsource/crowdsourcing" may be used interchangeably with "crowd-source/crowdsourcing."

In one example, as shown at 708, the crowdsourcing data/information 706 may include identification of occupant(s) in a vehicle and at least one feature associated with at least one occupant. The identification of occupant(s) may refer to identifying whether an occupant in the vehicle is a human, an animal, or an object (e.g., a luggage, a bag, etc.), and/or the number of occupants in the vehicle. The at least one feature may refer to at least one characteristic of an occupant, such as the age of the occupant (e.g., a newborn/infant 0-12 months, a toddler 1-5 years old, a kid 5-13 years old, a teenager 13-18 old, an adult over 18 years old, etc.), the gender of the occupant (e.g., male, female, etc.), the species of the occupant (e.g., the breed of a dog/cat, etc.), the type of the occupant (e.g., a human, an animal, a non-living object, etc.), the size of the occupant (e.g., small, medium, large, 30-40 kg, 50-70 kg, etc.), a gesture of the occupant (e.g., looking out of the vehicle window frequently), a pattern of the occupant (e.g., stopping the vehicle every X hours), and/or a behavior of the occupant (e.g., changing position frequently, massaging his/her body frequently, exhibiting a sign of fatigue, unbuckling the seatbelt, etc.).

In one aspect, the identification of occupant(s) and/or the identification of the at least one feature associated with at least one occupant may be performed by an in-cabin monitoring system (ICMS) associated with the vehicle. For example, an ICMS may be configured to determine the number of people in a vehicle, the number of adults in a vehicle, the number and age of kids in a vehicle, the number of pets and their approximate size and species in a vehicle, etc. In some scenarios, an ICMS may also be configured to detect the gesture, pattern, and/or behavior of occupant(s) (e.g., occupant(s) looking out for traffic signs or making actions that imply they are looking to take a stop, etc.). In some configurations, the ICMS may also be configured to monitor the conversation of occupant(s) and detect whether certain defined keywords (e.g., restroom, stop, break, etc.) have appeared in the conversation. These gestures, patterns, behaviors, and/or keywords may be used by the server 702 for determining whether at least one occupant is looking for a stop. For example, if 50% of vehicles in the set of vehicles 704 stop in 15 minutes after the word "restroom" is detected, then the server 702 may recommend a stop for occupant(s) of a vehicle that is within 15 minutes of traveling time of the vehicle when the word "restroom" is detected in the vehicle.

For purposes of the present disclosure, an ICMS may refer to a technology used in vehicles, such as automotive vehicles, to monitor the interior of a vehicle's cabin. The ICMS may enhance the safety of a vehicle by monitoring the well-being of both the driver and passengers. An ICMS may typically employ various sensors, radars, and/or cameras (which may include infrared cameras), etc. placed within the cabin of the vehicle to monitor different aspects of the interior environment of the vehicle. In some examples, an ICMS may be configured to monitor eyes of the driver and/or occupant(s) (e.g., via at least one camera), and the ICMS may determine which direction(s) the driver and/or an occupant is looking. Thus, the ICMS may determine whether the driver is focusing on the driving (e.g., looking straight towards the road instead of looking down, possibly at a mobile phone) or if the driver or an occupant is looking for a rest area (e.g., the eyes of the driver or the occupant shift to rest area signs (frequently) whenever there are rest area signs), etc.

In another example, as shown at 710, the crowdsourcing data/information 706 may include or may be associated with a vehicle state (e.g., parked, reverse, neutral, driving, etc.). For example, a vehicle may be configured to upload its crowdsourcing data/information when the vehicle is in a parked state or when the vehicle is travelling below a speed threshold or stops for a defined duration (e.g., travelling at 5 km per hour for 10 minutes, stopping for 5 minutes, etc.). This information (e.g., the vehicle state) may enable the server 702 to determine whether a vehicle is likely stopped for a rest/break, or is stopped just for a traffic light, etc.

In another example, as shown at 712, the crowdsourcing data/information 706 may include a time of the day (e.g., when the vehicle starts travelling, when the vehicle is stopped, etc.) and/or the duration for each stop/stay. For example, a vehicle may be configured to include the time it starts travelling, the time it stops (e.g., the time the vehicle is shifted to a parked state), and the duration of the vehicle's stop (e.g., the duration that the vehicle is in the parked state) in the crowdsourcing data/information 706. This information may enable the server 702 to identify how likely/often a set of occupants (or a combination of occupants) is going to look for a rest area if they leave at certain time, and/or whether a place a vehicle stopped is suitable for a long break or a short break, etc. For example, the information may enable the server to determine that vehicles start driving at 7:00-8:00 AM are likely to look for a rest area around 11:00 AM-12:00 PM, vehicles with kids are likely to stop at an area with playground for a longer duration, vehicles with pets are likely to stop at a park for a longer duration, etc. In another example, short duration stops by similar drivers with pets/kids may imply undesirability of these stops (e.g., these stops may not be suitable for pets/kids). In some implementations, the vehicle may also transmit just an indication to the server 702 when it arrives or departs an area, and the server may determine the time and the duration of the stay for the vehicle (e.g., based on the time the indication is received by the server or transmitted by the vehicle, etc.)

In another example, as shown at 714, the crowdsourcing data/information 706 may include operational design domain (ODD) description of a vehicle. The ODD may describe the limits and operating conditions for which an automated driving system is designed, where the server 702 may utilize such information to determine/recommend stop areas for vehicles with similar ODD descriptions.

In another example, as shown at 716, the crowdsourcing data/information 706 may include location(s) of a vehicle, such as location(s) where a vehicle is stopped for a defined duration (e.g., stops at least 10 minutes). For example, the on-board unit (OBU) or on-board GPS/GNSS system of a vehicle or a smartphone used for navigation in a vehicle may determine the location of the vehicle (e.g., based on GPS/GNSS system and/or network-based positioning as described in connection with FIG. 4) when it detects that the vehicle has stopped, and may include this information in the crowdsourcing data/information 706. Then, the server 702 may recommend this location to other drivers (e.g., the location may be unpopular or unknown to a navigation application/database). In some implementations, the server 702 may also obtain additional information associated with a location from other sources. For example, by obtaining a location where a vehicle stops (e.g., a set of coordinates, a name of the place, etc.), the server 702 may obtain additional information about that location (e.g., from other sources), such as the type of the location (e.g., a gas station, a rest area, a shopping mall, a picnic area, etc.), the weather condition at that location, the opening hour of that location (if any), and/or rules and conditions apply to that location (e.g., suitable for just adults, maximum occupants, road closure every Sunday), etc. This may enable the server 702 to recommend more suitable stop areas for a set of occupants.

In another example, as shown at 718, the crowdsourcing data/information 706 may include surrounding information related to places where a vehicle is stopped, where the surrounding information may be based on sensor data obtained by the vehicle, such as images captured by the camera(s) of the vehicle. The sensor data may include any data that is obtained using at least one sensor of the vehicle. For example, when a vehicle is parked in an area, the vehicle may capture the images of its surrounding (e.g., the surrounding of the area) using one or more external cameras of the vehicle. Then, the vehicle may include the captured images in its crowdsourcing data/information 706. Based on this information, the server 702 may be able to identify the specifics about the area, such as whether the area includes grassy lands or pave roads, the amount of visitors (e.g., based on the number of parked cars and people captured in the image), hazard(s) associated with the area (e.g., near/under a cliff), etc. This information may also enable the server 702 to identify/label a route or an area, such as determining a route is a scenic route, a remote route, etc.). In another example, sensor data may include a weather condition that is detected using a weather/environmental sensor or a camera, and/or the duration of an occupant leaving and returning the vehicle that is detected using a camera, etc. This information may enable the server 702 to determine whether a place is suitable for a long/short break for a specified group of occupants and/or is suitable for certain weather conditions (e.g., rainy days, snowing days, etc.). For example, based on the sensor data collected from the set of vehicles 704, the server 702 may determine that Place Y is suitable for kids under a rainy day as vehicles with at least one kid often stops at Place Y for at least 20 minutes under rainy days before moving again (e.g., the duration of a kid leaving and returning the vehicle is detected to be at least 20 minutes).

In another example, as shown at 720, the crowdsourcing data/information 706 may include the navigation information associated with a vehicle, such as the starting point of the vehicle, the destination of the vehicle (e.g., input by a user), and/or the route planned by a navigation system, etc. The server 702 may use the route/navigation information collected from the set of vehicles 704 to learn stop area(s) for people (e.g., with different combinations of occupants) who are travelling from Place A to Place B, for people who are heading to Place B, and/or for people who are taking a specific route (e.g., a specific highway/freeway, a scenic route, etc.).

Based on the crowdsourcing data/information 706 collected from the set of vehicles 704, the server 702 may aggregate and analyze the data, and create a set of mapping that maps different target locations (e.g., recommended stops/break areas) to different combinations of occupants in a vehicle, different locations, different time of the day, etc. Then, the server 702 may use the aggregated and analyzed data for providing stop/break area recommendations to drivers/vehicles with similar settings (discussed in details below). Note that a vehicle may transmit the crowdsourcing data/information 706 to the server 702 via a single message or multiple messages, periodically or non-periodically. For example, a vehicle may be configured to transmit its location (e.g., as described in connection with 716) and time of the day (e.g., as described in connection with 712) periodically, and transmit the occupant information (e.g., as described in connection with 708) just at a beginning of a trip (e.g., when a destination is entered into a navigation system, when the vehicle engine is started/ignited, etc.).

Figure 8:
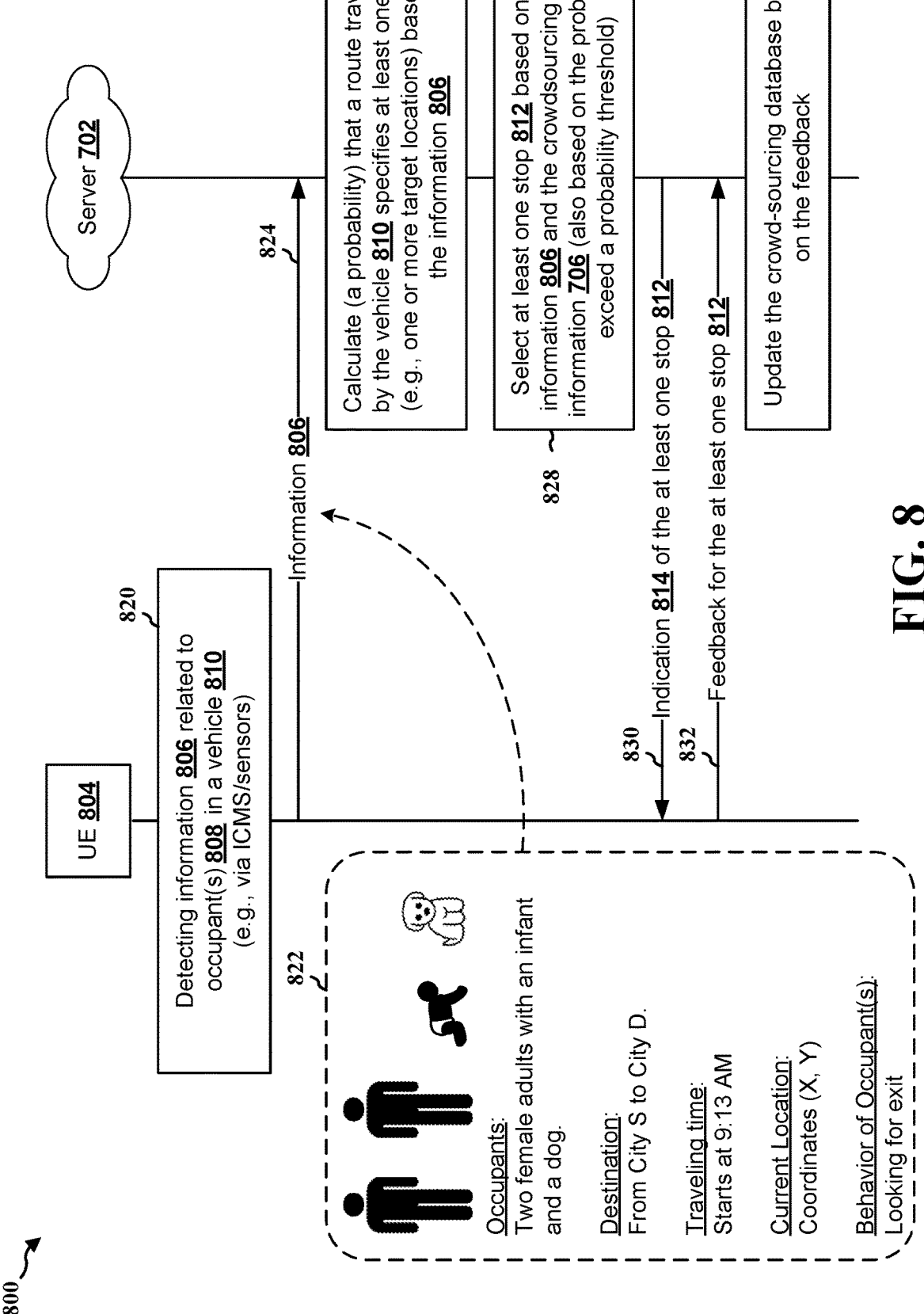
FIG. 8 is a communication flow illustrating an example of a server recommending one or more stops for a vehicle (e.g., its occupants) in accordance with various aspects of the present disclosure.

FIG. 8 is a communication flow 800 illustrating an example of a server recommending one or more stops for a vehicle (e.g., its occupants) in accordance with various aspects of the present disclosure. The numberings associated with the communication flow 800 do not specify a particular temporal order and are merely used as references for the communication flow 800. Aspects presented herein may enable a server (e.g., the server 702) to recommend one or more stops (which may be referred to as target locations for purposes of the present disclosure) for a vehicle based at least on information associated with occupant(s) of the vehicle. For purposes of the present disclosure, a stop may broadly refer to a place in which a vehicle may stay there for at least a short period of time. For example, a stop may be a rest area beside a highway, a national park, a place that offers public restroom, a park with playgrounds, etc.

At 820, a UE 804 (e.g., an in-vehicle navigation system, an on-board unit (OBU), a smartphone that is running a navigation application, etc.) may be configured to detect/identify information 806 related to one or more occupants 808 in a vehicle 810 (e.g., a driver, one or more passengers, one or more animals, one or more objects, etc.), such as a number of occupants in the vehicle 810, and at least one feature associated with at least one occupant in the one or more occupants 808. As described in connection with 708 of FIG. 7, the at least one feature may include the age of an occupant, the gender of an occupant, the species of an occupant, the type of an occupant, the size of an occupant, a gesture of an occupant, a pattern of an occupant, and/or a behavior of an occupant, etc.

In some examples, the UE 804 may detect or identify the information 806 related the one or more occupants 808 in the vehicle 810 using an ICMS or at least one sensor (e.g., a camera). For example, as shown at 822, an ICMS or a camera in the vehicle 810 may detect that there are four occupants in the vehicle 810, which include two female adults, an infant (e.g., between three to twelve months old), and a dog that weights approximately 12 pounds. In addition, the ICMS/sensor(s) may also be configured to detect gesture, pattern, drowsiness, and/or behavior of occupant(s), such as whether an occupant is exhibiting a sign related to fatigue, e.g., the first female adult is removing/adjusting her seatbelt frequently, the second female adult is looking for stop areas, the first female adult is massaging her neck/legs, the infant is crying, and/or the two female adults are speaking certain keywords (e.g., rest, pee, tired, etc.).

At 824, the UE 804 may transmit the detected information 806 (e.g., information related to occupants 808) to the server 702. In some examples, the information 806 may also include additional information that may not be related to the one or more occupants 808, but may enable the server 702 to make more accurate/suitable recommendation for stops. For example, the additional information may include speed of the vehicle (e.g., for the server 702 to determine whether the vehicle 810 is on a freeway and/or the distance that can be travelled by the vehicle 810 in a defined period, etc.), a travelling time of the vehicle 810 (e.g., for the server 702 to estimate when a stop is recommended), an input destination and/or the estimated route of the vehicle (e.g., for the server 702 to choose stop(s) that are along the route to the destination), a previously-stopped location of the vehicle (e.g., for the server 702 to determine when and where of a next-stopped location), a current location of the vehicle 810, feedback or a recommendation from occupants (e.g., for the server 702 to learn occupant(s)' favored options), the ODD description/ICMS specification of the vehicle 810, and/or the vehicle state of the vehicle 810, etc.

At 826 based on the information 806 provided by the UE 804, the server 702 may calculate/determine whether any of the one or more occupants 808 specifies at least one stop within a specified time frame (e.g., a break within next 30 minutes, one hour, etc.) or before reaching a destination (e.g., before reaching City D). For example, if the server 702 has the planned route information of the UE 804 (e.g., routes recommended by the UE 804 from City S to City D), based on the previous stop (or the starting time) of the vehicle 810, the current location of the vehicle 810, and/or the travelling time of the vehicle 810, the server 702 may determine whether to recommend at least one stop that is in proximity or along the planned route of the vehicle 810. As an illustration, the server 702 may recommend a stop if the vehicle 810 has been on the road for more than two hours and the destination is still three hours away, or that the infant in the vehicle 810 has been crying for 20 minutes, etc. On the other hand, if the server 702 determines that the vehicle 810 is going to reach its destination within a defined period (e.g., within ten minutes, twenty minutes, etc.), the server 702 may be configured not to recommend any stops (even if the information 806 implies that a stop is specified).

In some examples, the calculation/determination of whether to recommend at least one stop (e.g., at least one target location) to a user may also depend on a probability. For example, based on the information 806 provided by the UE 804, the server 702 may calculate the probability of whether any of the one or more occupants 808 specifies at least one stop within the specified time frame or before reaching the destination, and the server 702 may select/recommend at least one stop if the probability exceeds a probability threshold (e.g., ≥40%, ≥50%, etc.).

At 828, the server 702 may select at least one stop 812 (e.g., at least one target location from multiple candidate target locations) based on the information 806 and also based the crowdsourcing data/information 706 (e.g., as described in connection with FIG. 7). For example, if the server 702 determines that at least one occupant in the one or more occupants 808 (e.g., two female adults with an infant and a dog) specifies a break, the server 702 may recommend a stop that is suitable for females (e.g., safe areas with lots of people), a stop that is suitable for changing diapers for a baby such as a public and spacious restroom, and/or a stop that is suitable for walking the dog, where these recommended stops may be selected based on the crowd-sourcing data/information 706 (e.g., based on vehicles with similar occupants and/or conditions).

In another example, instead of selecting at least one stop 812, the server 702 may also be configured to filter out undesirable/unsuitable places for a list of recommended stops. For example, based on the crowdsourcing data/information 706, the server 702 may filter out stops that people with pet(s)/infant(s) just stop briefly (e.g., which may be an indication that these stops are not suitable for pet(s)/infant(s)), stops that are sparsely populated (e.g., may be deemed to be less safe for female travelers), and/or places that are unsuitable for infant and pet, etc. In some examples, as described in connection with 826, the server 702 may select the at least one stop 812 based on the probability of at least one occupant in the vehicle 810 specifies a break exceeds a probability threshold.

At 830, after the server 702 selects at least one stop 812, the server 702 may send an indication 814 (e.g., a message, a signaling, etc.) of the selected at least one stop 812 to the UE 804, where the UE 804 may display (via a screen) the selected at least one stop 812 to its user (e.g., the one or more occupants 808, the driver of the vehicle 810, etc.).

In some implementations, as shown at 832, the UE 804 may enable the user to provide a feedback for the at least one stop 812 selected by the server 702, such as by providing ranking points (e.g., rank 1 for a stop which the user deems to be suitable/desirable and rank 5 for a stop which the user deems to be unsuitable/desirable, etc.). Then, as shown at 834, based on the feedback (or the ranking points), the 702 may update its crowdsourcing databased (e.g., by noting/re-ranking places are suitable or unsuitable for pet(s)/infant(s)). In other words, the server 702 may be configured to adapt recommendation based on driver feedback to suggestions.

Figure 9:
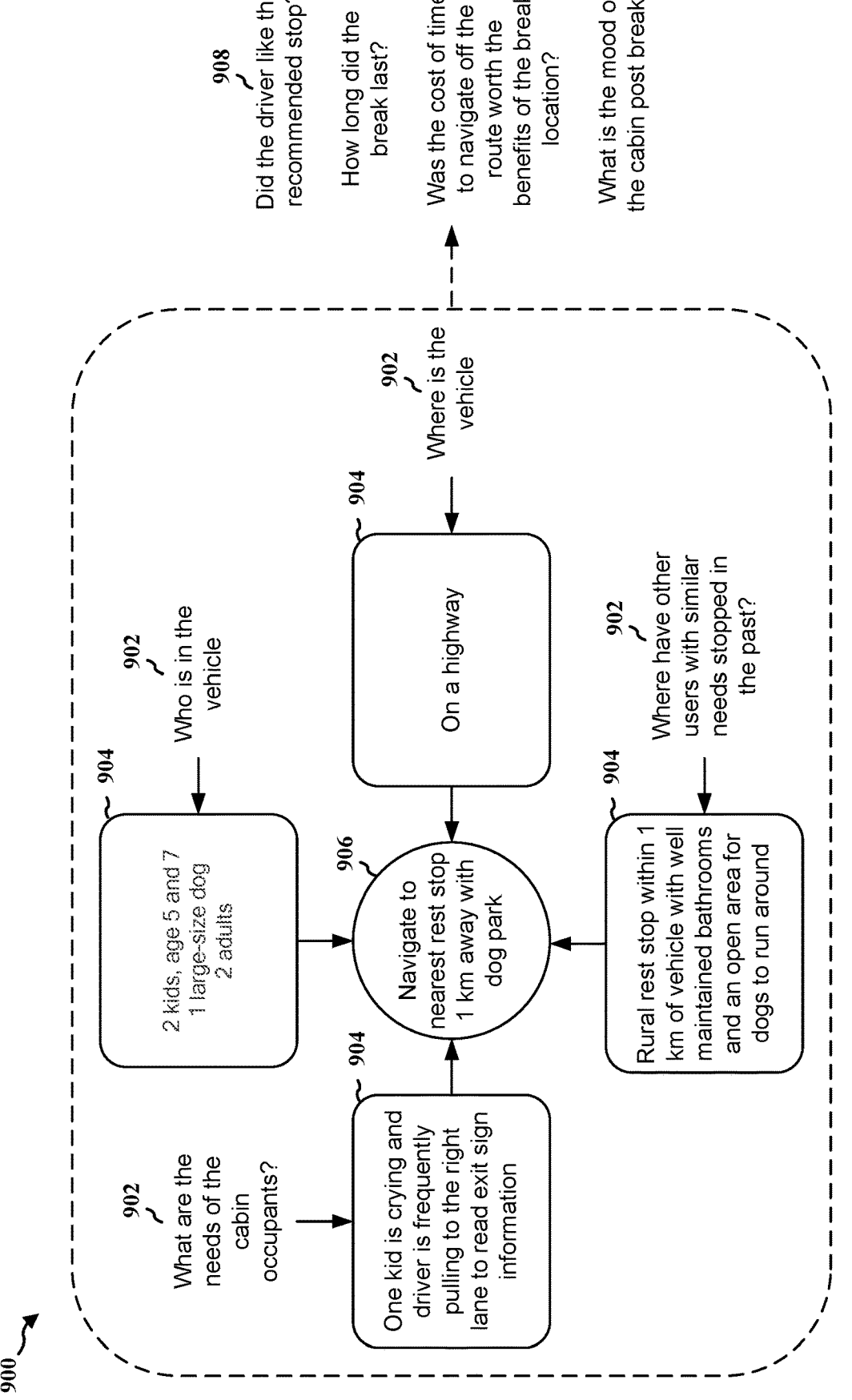
FIG. 9 is a diagram illustrating an example use case of a server providing automated break location recommendations in accordance with various aspects of the present disclosure.

FIG. 9 is a diagram 900 illustrating an example use case of a server providing automated break location recommendations in accordance with various aspects of the present disclosure.

As shown at 902, to be able to recommend break locations for a vehicle (or for at least one occupant within the vehicle), a server (e.g., the server 702) may be configured to first collect at least information associated with the occupant(s) in the vehicle and the location of the vehicle. Such information may be collected via an ICMS or sensor(s) of the vehicle. For example, the server may be specified to know (1) who is in the vehicle, (2) where is the vehicle (currently), (3) what are the needs of the occupant(s), and (4) where have other users with similar needs stopped in the past, etc.

As shown at 904, via the ICMS or sensor(s) of the vehicle (and also based on the crowdsourcing information), the server may determine that (1) there are two kids (approximately 5 and 7 years old), two adults (approximately over 21 years old), and one large-size dog in the vehicle, (2) the vehicle is currently travelling on a highway at approximate coordinates (X, Y) or heading to City X, (3) one child is crying and driver is frequently pulling to the right lane to read exit sign information, and (4) there is a rural rest stop within 1 km of the vehicle with well-maintained bathrooms and an open area for dogs to run around.

A shown at 906, based on such determination, the server may navigate the vehicle to (or recommend the user) that rural rest stop which is 1 km away from the vehicle, where this rural rest stop is selected by the server based on other vehicles with similar occupants have stopped here in the past.

As shown at 908, in some implementations, the server may also be configured to receive feedbacks/ranking from the user, which may include feedbacks such as whether the user likes the recommended stop, how long did the break last, whether the cost of time to navigate off the route worth the benefits of the break location, and/or what is the mood of the occupants after break (e.g., if the mood is improved, then the place is likely recommended/suitable for the break), etc. Then the server may update its crowdsourcing database based on the feedbacks (and retrain its artificial intelligence (AI)/machine learning (ML) module(s) if they are used).

Aspects presented herein are directed to techniques for providing recommendations for break points along travel routes based on crowdsourcing information. The proposed solution may contain the following aspects: 1) crowdsourcing various kinds of data including: location of stops, duration of stops, number of occupants, number of children, pets, etc. 2) Provide break point recommendations based on various criteria that potentially match or correspond to crowdsourced data: travel route, anticipated time of travel, user profile and favored options, information regarding occupants (e.g., number of adults, number of pets, number of kids, etc.), behaviors of occupants indicating that a stop may be needed). 3) Refine/Adapt recommendations based on user feedback and information collected during and after the recommended break point, etc.

Figure 10:
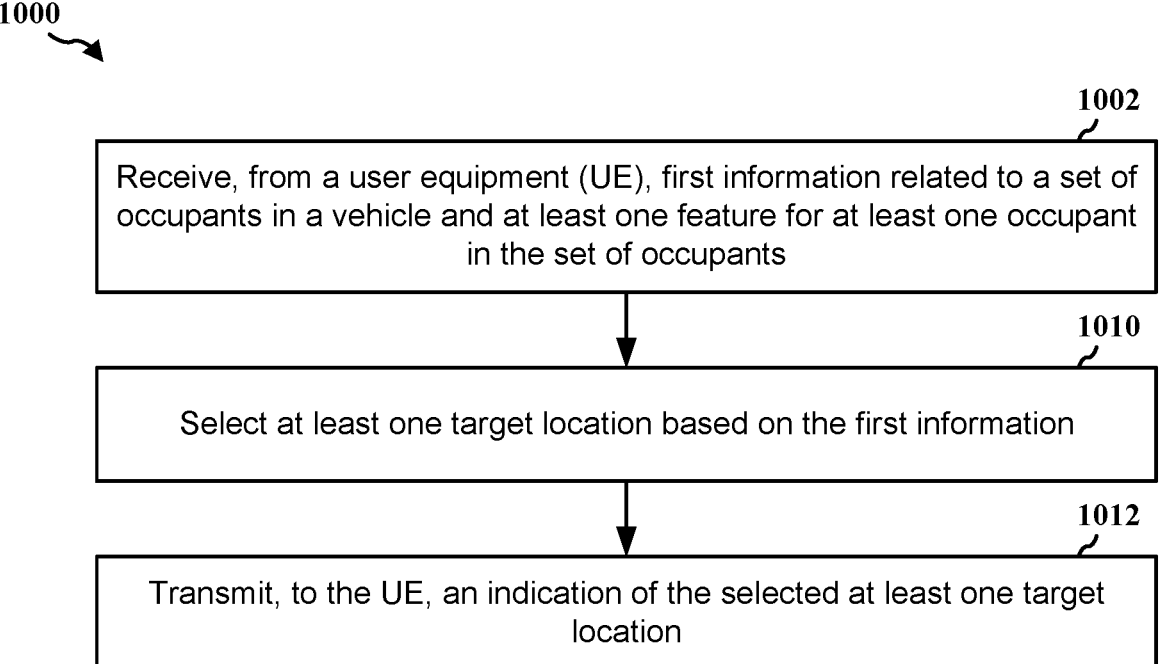
FIG. 10 is a flowchart of a method of wireless communication.

FIG. 10 is a flowchart 1000 of a method of wireless communication. The method may be performed by a server (e.g., the one or more location servers 168; the base station 102; the server 702; the network entity 1260). The method may enable the server to recommend break/stop locations (or filter out unrecommended break/stop locations) for occupant(s) of a vehicle (e.g., the driver and his/her passenger(s)) based on where people with similar occupants in their vehicles are taking breaks.

At 1002, the server may receive, from a UE, first information related to a set of occupants in a vehicle and at least one feature for at least one occupant in the set of occupants, such as described in connection with FIGS. 7 and 8. For example, at 824 of FIG. 8, the server 702 may receive information 806 from the UE 804, where information 806 may be related to one or more occupants 808 in a vehicle 810, such as a number of occupants in the vehicle 810, and at least one feature associated with at least one occupant in the one or more occupants 808. The reception of the first information may be performed by, e.g., the location recommendation component 199, the network processor(s) 1212, and/or the network interface 1280 of the network entity 1260 in FIG. 12.

In one example, the set of occupants may include at least one human, at least one animal, or a combination thereof.

In another example, the at least one feature may include: an age of an occupant, a gender of the occupant, a species of the occupant, a size of the occupant, a gesture of the occupant, a pattern of the occupant, a behavior of the occupant, or a combination thereof.

In another example, to receive the first information, the server may receive the first information via an in-cabin monitoring system (ICMS) associated with the vehicle.

In another example, the UE may be the vehicle, an on-board unit (OBU) in the vehicle, or a mobile device.

In another example, the server may calculate, based on the first information, a probability that a route for the vehicle includes a set of target locations, such as described in connection with FIGS. 7 and 8. For example, at 826 of FIG. 8, the server 702 may calculate (a probability) that a route travelled by the vehicle 810 specifies at least one stop (e.g., one or more target locations) based on the information 806. The calculation of the probability may be performed by, e.g., the location recommendation component 199, the network processor(s) 1212, and/or the network interface 1280 of the network entity 1260 in FIG. 12. In some implementations, the set of target locations includes at least one of: a set of stops along the route, wherein the set of stops includes a set of second locations where the vehicle is not moving, or a set of first locations where a speed of the vehicle is less than a threshold speed. In some implementations, to calculate the probability that the route for the vehicle includes the set of target locations, the UE may detect that at least one occupant in the set of occupants is exhibiting a defined sign or a defined pattern associated with seeking the set of first locations or the set of stops. In some implementations, the calculation of the probability that the route for the vehicle includes the set of target locations is further based on at least one of: a time of day, second information from crowdsourcing, or a combination thereof.

At 1010, the server may select at least one target location based on the first information, such as described in connection with FIGS. 7 and 8. For example, at 828 of FIG. 8, the server 702 may select at least one stop 812 based on the information 806 and the crowdsourcing data/information 706 (also based on the probability exceed a probability threshold). The selection of the at least one target location may be performed by, e.g., the location recommendation component 199, the network processor(s) 1212, and/or the network interface 1280 of the network entity 1260 in FIG. 12.

In one example, to select the at least one target location, the server may select the at least one target location further based on at least one of: a time of day, a first number of occupants in the set of occupants, a second number of occupants with an age above or below an age threshold, a behavior pattern of the set of occupants, one or more keywords detected in the vehicle, a travelling time of the vehicle, an input destination of the vehicle, a previous stopped location of the vehicle, feedback or a recommendation from the set of occupants, or a speed of the vehicle.

At 1012, the server may transmit, to the UE, an indication of the selected at least one target location, such as described in connection with FIGS. 7 and 8. For example, at 830 of FIG. 8, the server 702 may transmit an indication 814 to the UE 804 that indicates the at least one stop 812. The transmission of the indication may be performed by, e.g., the location recommendation component 199, the network processor(s) 1212, and/or the network interface 1280 of the network entity 1260 in FIG. 12.

In one example, the server may receive, from the UE, a second indication of at least one of: a first number of occupants in the set of occupants, a second number of occupants with an age above or below an age threshold, a behavior pattern of the set of occupants, one or more keywords detected in the vehicle, a speed of the vehicle, a travelling time of the vehicle, an input destination of the vehicle, a previously-stopped location of the vehicle, feedback or a recommendation from the set of occupants, or a combination thereof, where the selection of the at least one target location is further based on the second indication, such as described in connection with FIGS. 7 and 8. For example, as discussed in connection with 824 of FIG. 8, the information 806 may also include additional information that may not be related to the one or more occupants 808, but may enable the server 702 to make more accurate/suitable recommendation for stops. For example, the additional information may include speed of the vehicle (e.g., for the server 702 to determine whether the vehicle 810 is on a freeway and/or the distance that can be travelled by the vehicle 810 in a defined period, etc.), a travelling time of the vehicle 810 (e.g., for the server 702 to estimate when a stop is recommended), an input destination and/or the estimated route of the vehicle (e.g., for the server 702 to choose stop(s) that are along the route to the destination), a previously-stopped location of the vehicle (e.g., for the server 702 to determine when and where of a next-stopped location), a current location of the vehicle 810, feedback or a recommendation from occupants (e.g., for the server 702 to learn occupant(s)' favored options), the ODD description/ICMS specification of the vehicle 810, and/or the vehicle state of the vehicle 810, etc. The reception of the second indication may be performed by, e.g., the location recommendation component 199, the network processor(s) 1212, and/or the network interface 1280 of the network entity 1260 in FIG. 12.

In another example, the server may obtain second information based on crowdsourcing prior to the selection of the at least one target location, where to select the at least one target location, the server may select the at least one target location further based on the second information, such as described in connection with FIGS. 7 and 8. For example, as discussed in connection with FIG. 7, the server 702 may receive crowdsourcing data/information 706 from a set of vehicles 704. The obtaining of the second information may be performed by, e.g., the location recommendation component 199, the network processor(s) 1212, and/or the network interface 1280 of the network entity 1260 in FIG. 12. In some implementations, to obtain the second information based on the crowdsourcing, the server may collect, from each UE in a set of UEs, third information related to a second set of occupants in a second vehicle and at least one second feature for at least one occupant in the second set of occupants.

FIG. 11 is a flowchart 1100 of a method of wireless communication. The method may be performed by a server (e.g., the one or more location servers 168; the base station 102; the server 702; the network entity 1260). The method may enable the server to recommend break/stop locations (or filter out unrecommended break/stop locations) for occupant(s) of a vehicle (e.g., the driver and his/her passenger(s)) based on where people with similar occupants in their vehicles are taking breaks.

At 1102, the server may receive, from a UE, first information related to a set of occupants in a vehicle and at least one feature for at least one occupant in the set of occupants, such as described in connection with FIGS. 7 and 8. For example, at 824 of FIG. 8, the server 702 may receive information 806 from the UE 804, where information 806 may be related to one or more occupants 808 in a vehicle 810, such as a number of occupants in the vehicle 810, and at least one feature associated with at least one occupant in the one or more occupants 808. The reception of the first information may be performed by, e.g., the location recommendation component 199, the network processor(s) 1212, and/or the network interface 1280 of the network entity 1260 in FIG. 12.

In one example, the set of occupants may include at least one human, at least one animal, or a combination thereof.

In another example, the at least one feature may include: an age of an occupant, a gender of the occupant, a species of the occupant, a size of the occupant, a gesture of the occupant, a pattern of the occupant, a behavior of the occupant, or a combination thereof.

In another example, to receive the first information, the server may receive the first information via an ICMS associated with the vehicle.

In another example, the UE may be the vehicle, an OBU in the vehicle, or a mobile device.

At 1106, the server may calculate, based on the first information, a probability that a route for the vehicle includes a set of target locations, such as described in connection with FIGS. 7 and 8. For example, at 826 of FIG. 8, the server 702 may calculate (a probability) that a route travelled by the vehicle 810 specifies at least one stop (e.g., one or more target locations) based on the information 806. The calculation of the probability may be performed by, e.g., the location recommendation component 199, the network processor(s) 1212, and/or the network interface 1280 of the network entity 1260 in FIG. 12.

In one example, the set of target locations includes at least one of: a set of stops along the route, where the set of stops includes a set of second locations where the vehicle is not moving, or a set of first locations where a speed of the vehicle is less than a threshold speed. In some implementations, to calculate the probability that the route for the vehicle includes the set of target locations, the server may detect that at least one occupant in the set of occupants is exhibiting a defined sign or a defined pattern associated with seeking the set of first locations or the set of stops.

In another example, the calculation of the probability that the route for the vehicle includes the set of target locations may be further based on at least one of: a time of day, the second information, or a combination thereof.

At 1110, the server may select at least one target location based on the first information, such as described in connection with FIGS. 7 and 8. For example, at 828 of FIG. 8, the server 702 may select at least one stop 812 based on the information 806 and the crowdsourcing data/information 706 (also based on the probability exceed a probability threshold). The selection of the at least one target location may be performed by, e.g., the location recommendation component 199, the network processor(s) 1212, and/or the network interface 1280 of the network entity 1260 in FIG. 12.

In one example, to select the at least one target location, the server may select the at least one target location further based on at least one of: a time of day, a first number of occupants in the set of occupants, a second number of occupants with an age above or below an age threshold, a behavior pattern of the set of occupants, one or more keywords detected in the vehicle, a travelling time of the vehicle, an input destination of the vehicle, a previous stopped location of the vehicle, feedback or a recommendation from the set of occupants, or a speed of the vehicle.

At 1112, the server may transmit, to the UE, an indication of the selected at least one target location, such as described in connection with FIGS. 7 and 8. For example, at 830 of FIG. 8, the server 702 may transmit an indication 814 to the UE 804 that indicates the at least one stop 812. The transmission of the indication may be performed by, e.g., the location recommendation component 199, the network processor(s) 1212, and/or the network interface 1280 of the network entity 1260 in FIG. 12.

In one example, as shown at 1104, the server may receive, from the UE, a second indication of at least one of: a first number of occupants in the set of occupants, a second number of occupants with an age above or below an age threshold, a behavior pattern of the set of occupants, one or more keywords detected in the vehicle, a speed of the vehicle, a travelling time of the vehicle, an input destination of the vehicle, a previously-stopped location of the vehicle, feedback or a recommendation from the set of occupants, or a combination thereof, where the selection of the at least one target location is further based on the second indication, such as described in connection with FIGS. 7 and 8. For example, as discussed in connection with 824 of FIG. 8, the information 806 may also include additional information that may not be related to the one or more occupants 808, but may enable the server 702 to make more accurate/suitable recommendation for stops. For example, the additional information may include speed of the vehicle (e.g., for the server 702 to determine whether the vehicle 810 is on a freeway and/or the distance that can be travelled by the vehicle 810 in a defined period, etc.), a travelling time of the vehicle 810 (e.g., for the server 702 to estimate when a stop is recommended), an input destination and/or the estimated route of the vehicle (e.g., for the server 702 to choose stop(s) that are along the route to the destination), a previously-stopped location of the vehicle (e.g., for the server 702 to determine when and where of a next-stopped location), a current location of the vehicle 810, feedback or a recommendation from occupants (e.g., for the server 702 to learn occupant(s)' favored options), the ODD description/ICMS specification of the vehicle 810, and/or the vehicle state of the vehicle 810, etc. The reception of the second indication may be performed by, e.g., the location recommendation component 199, the network processor(s) 1212, and/or the network interface 1280 of the network entity 1260 in FIG. 12.

In another example, as shown at 1108, the server may obtain second information based on crowdsourcing prior to the selection of the at least one target location, where to select the at least one target location, the server may select the at least one target location further based on the second information, such as described in connection with FIGS. 7 and 8. For example, as discussed in connection with FIG. 7, the server 702 may receive crowdsourcing data/information 706 from a set of vehicles 704. The obtaining of the second information may be performed by, e.g., the location recommendation component 199, the network processor(s) 1212, and/or the network interface 1280 of the network entity 1260 in FIG. 12. In some implementations, to obtain the second information based on the crowdsourcing, the server may collect, from each UE in a set of UEs, third information related to a second set of occupants in a second vehicle and at least one second feature for at least one occupant in the second set of occupants.

Figure 12:
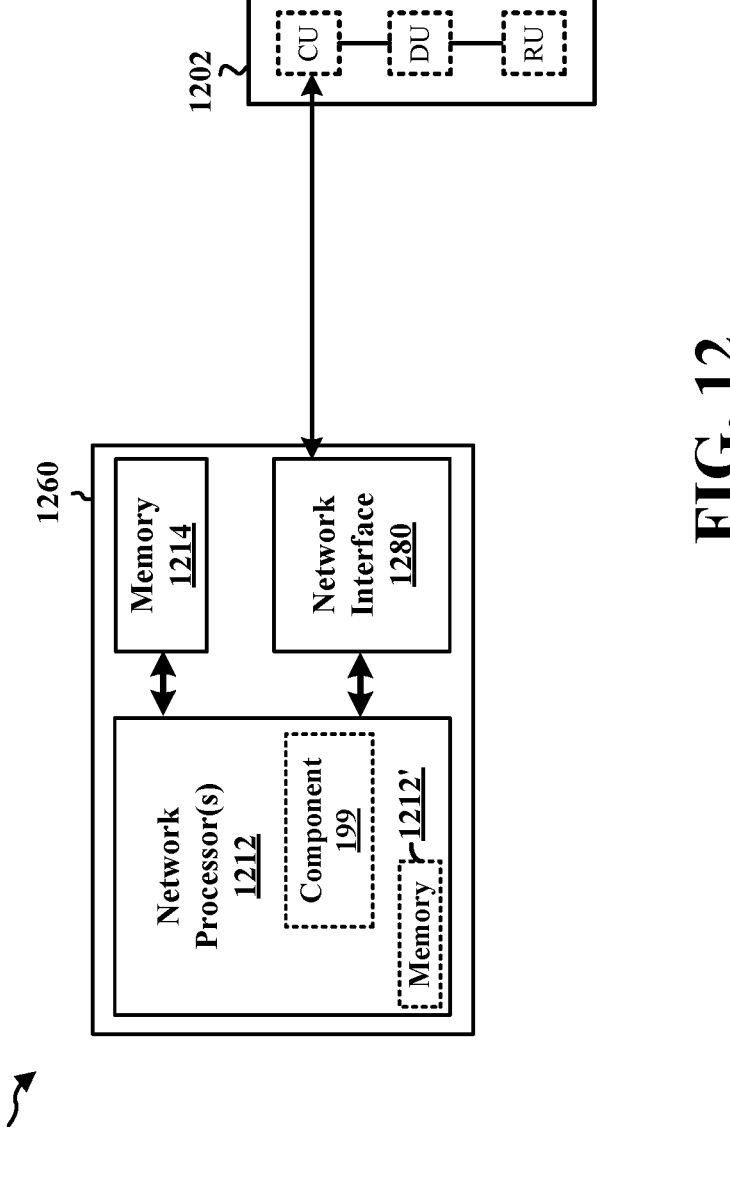
FIG. 12 is a diagram illustrating an example of a hardware implementation for an example network entity.

FIG. 12 is a diagram 1200 illustrating an example of a hardware implementation for a network entity 1260. In one example, the network entity 1260 may be within the core network 120. The network entity 1260 may include at least one network processor 1212. The network processor(s) 1212 may include on-chip memory 1212'. In some aspects, the network entity 1260 may further include additional memory modules 1214. The network entity 1260 communicates via the network interface 1280 directly (e.g., backhaul link) or indirectly (e.g., through a RIC) with the CU 1202. The on-chip memory 1212' and the additional memory modules 1214 may each be considered a computer-readable medium/memory. Each computer-readable medium/memory may be non-transitory. The network processor(s) 1212 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the location recommendation component 199 may be configured to receive, from a UE, first information related to a set of occupants in a vehicle and at least one feature for at least one occupant in the set of occupants. The location recommendation component 199 may also be configured to select at least one target location based on the first information. The location recommendation component 199 may also be configured to transmit, to the UE, an indication of the selected at least one target location. The location recommendation component 199 may be within the network processor(s) 1212. The location recommendation component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1260 may include a variety of components configured for various functions. In one configuration, the network entity 1260 may include means for receiving, from a UE, first information related to a set of occupants in a vehicle and at least one feature for at least one occupant in the set of occupants. The network entity 1260 may further include means for selecting at least one target location based on the first information. The network entity 1260 may further include means for transmitting, to the UE, an indication of the selected at least one target location.

In one configuration, the set of occupants may include at least one human, at least one animal, or a combination thereof.

In another configuration, the network entity 1260 may further include means for calculating, based on the first information, a probability that a route for the vehicle includes a set of target locations.

In another configuration, the at least one feature may include: an age of an occupant, a gender of the occupant, a species of the occupant, a size of the occupant, a gesture of the occupant, a pattern of the occupant, a behavior of the occupant, or a combination thereof.

In another configuration, the means for receiving the first information may include configuring the network entity 1260 to receive the first information via an ICMS associated with the vehicle.

In another configuration, the UE may be the vehicle, an on-board unit (OBU) in the vehicle, or a mobile device.

In another configuration, the set of target locations includes at least one of: a set of stops along the route, where the set of stops includes a set of second locations where the vehicle is not moving, or a set of first locations where a speed of the vehicle is less than a threshold speed. In some implementations, the means for calculating the probability that the route for the vehicle includes the set of target locations may include configuring the network entity 1260 to detect that at least one occupant in the set of occupants is exhibiting a defined sign or a defined pattern associated with seeking the set of first locations or the set of stops.

In another configuration, the calculation of the probability that the route for the vehicle includes the set of target locations may be further based on at least one of: a time of day, the second information, or a combination thereof.

In another configuration, the means for selecting the at least one target location may include configuring the network entity 1260 to select the at least one target location further based on at least one of: a time of day, a first number of occupants in the set of occupants, a second number of occupants with an age above or below an age threshold, a behavior pattern of the set of occupants, one or more keywords detected in the vehicle, a travelling time of the vehicle, an input destination of the vehicle, a previous stopped location of the vehicle, feedback or a recommendation from the set of occupants, or a speed of the vehicle.

In another configuration, the network entity 1260 may further include means for receiving, from the UE, a second indication of at least one of: a first number of occupants in the set of occupants, a second number of occupants with an age above or below an age threshold, a behavior pattern of the set of occupants, one or more keywords detected in the vehicle, a speed of the vehicle, a travelling time of the vehicle, an input destination of the vehicle, a previously-stopped location of the vehicle, feedback or a recommendation from the set of occupants, or a combination thereof, where the selection of the at least one target location is further based on the second indication.

In another configuration, the network entity 1260 may further include means for obtaining the second information based on crowdsourcing prior to the selection of the at least one target location, where the means for selecting the at least one target location may include configuring the network entity 1260 to select the at least one target location further based on the second information. In some implementations, the means for obtaining the second information based on the crowdsourcing may include configuring the network entity 1260 to collect, from each UE in a set of UEs, third information related to a second set of occupants in a second vehicle and at least one second feature for at least one occupant in the second set of occupants.

The means may be the location recommendation component 199 of the network entity 1260 configured to perform the functions recited by the means.

Figure 13:
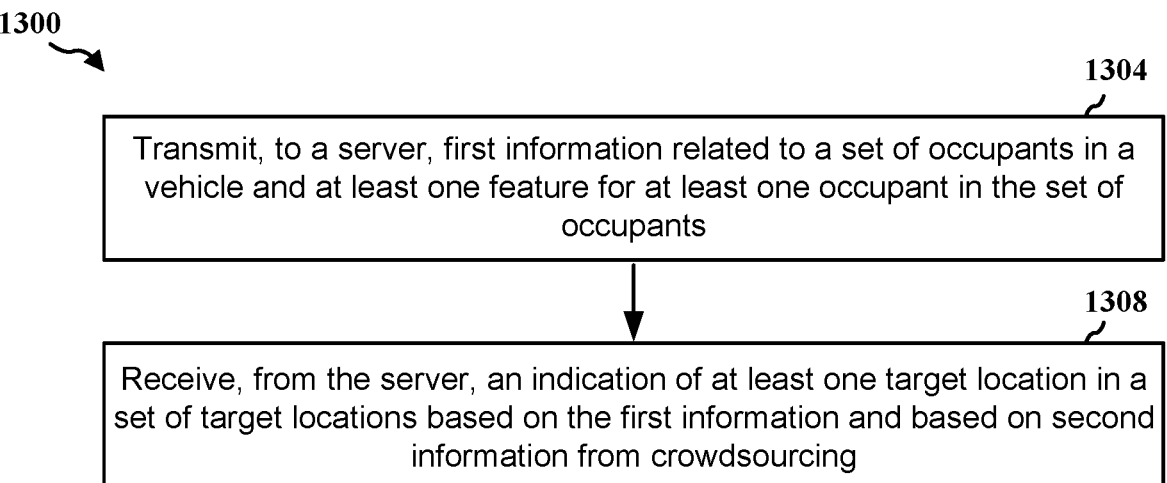
FIG. 13 is a flowchart of a method of wireless communication.

FIG. 13 is a flowchart 1300 of a method of wireless communication. The method may be performed by a UE (e.g., the UE 104, 404, 502, 504, 506, 508, 804; the apparatus 1504). The method may enable the UE provide information related to a set of occupants in a vehicle, and receive a set of recommended stops (e.g., target areas) based on the information.

At 1304, the UE may transmit, to a server, first information related to a set of occupants in a vehicle and at least one feature for at least one occupant in the set of occupants, such as described in connection with FIGS. 7 and 8. For example, at 824 of FIG. 8, the UE 804 may transmit information 806 to the server 702, where information 806 may be related to one or more occupants 808 in a vehicle 810, such as a number of occupants in the vehicle 810, and at least one feature associated with at least one occupant in the one or more occupants 808. The transmission of the first information may be performed by, e.g., the vehicle sensor component 198, the transceiver(s) 1522, the cellular baseband processor(s) 1524, and/or the application processor(s) 1506 of the apparatus 1504 in FIG. 15.

In one example, the set of occupants may include at least one human, at least one animal, or a combination thereof.

In another example, the at least one feature may include: an age of an occupant, a gender of the occupant, a species of the occupant, a size of the occupant, a gesture of the occupant, a pattern of the occupant, a behavior of the occupant, or a combination thereof.

In another example, the UE may be the vehicle, an OBU in the vehicle, or a mobile device.

At 1308, the UE may receive, from the server, an indication of at least one target location in a set of target locations based on the first information and based on second information from crowdsourcing, such as described in connection with FIGS. 7 and 8. For example, at 830 of FIG. 8, the UE 804 may receive an indication 814 to the UE 804 that indicates the at least one stop 812, where the at least one stop 812 is selected based on the information 806 and the crowdsourcing data/information 706. The reception of the indication may be performed by, e.g., the vehicle sensor component 198, the transceiver(s) 1522, the cellular baseband processor(s) 1524, and/or the application processor(s) 1506 of the apparatus 1504 in FIG. 15.

In one example, the set of target locations may include at least one of: a set of stops along a route, where the set of stops include a set of second locations where the vehicle is not moving, or a set of first locations where a speed of the vehicle is less than a threshold speed.

In another example, the UE may detect the first information via an ICMS prior to the transmission of the first information, such as described in connection with FIGS. 7 and 8. For example, at 820 of FIG. 8, the UE 804 (e.g., an in-vehicle navigation system, a smartphone that is running a navigation application, etc.) may be configured to detect/identify information 806 related to one or more occupants 808 in a vehicle 810 (e.g., a driver, one or more passengers, one or more animals, one or more objects, etc.), such as a number of occupants in the vehicle 810, and at least one feature associated with at least one occupant in the one or more occupants 808. In some examples, the UE 804 may detect or identify the information 806 related the one or more occupants 808 in the vehicle 810 using an ICMS or at least one sensor (e.g., a camera). The detection of the first information may be performed by, e.g., the vehicle sensor component 198, the ICMS 1540, the sensor(s) 1518, the camera 1532, the transceiver(s) 1522, the cellular baseband processor(s) 1524, and/or the application processor(s) 1506 of the apparatus 1504 in FIG. 15.

In another example, the UE may transmit, to the server, a second indication of at least one of: a first number of occupants in the set of occupants, a second number of occupants with an age above or below an age threshold, a behavior pattern of the set of occupants, one or more keywords detected in the vehicle, a speed of the vehicle, a travelling time of the vehicle, an input destination of the vehicle, a previously-stopped location of the vehicle, feedback or a recommendation from the set of occupants, or a combination thereof, where the at least one target location in the set of target locations is further based on the second indication, such as described in connection with FIGS. 7 and 8. For example, as discussed in connection with 824 of FIG. 8, the information 806 may also include additional information that may not be related to the one or more occupants 808, but may enable the server 702 to make more accurate/suitable recommendation for stops. For example, the additional information may include speed of the vehicle (e.g., for the server 702 to determine whether the vehicle 810 is on a freeway and/or the distance that can be travelled by the vehicle 810 in a defined period, etc.), a travelling time of the vehicle 810 (e.g., for the server 702 to estimate when a stop is recommended), an input destination and/or the estimated route of the vehicle (e.g., for the server 702 to choose stop(s) that are along the route to the destination), a previously-stopped location of the vehicle (e.g., for the server 702 to determine when and where of a next-stopped location), a current location of the vehicle 810, feedback or a recommendation from occupants (e.g., for the server 702 to learn occupant(s)' favored options), the ODD description/ICMS specification of the vehicle 810, and/or the vehicle state of the vehicle 810, etc. The transmission of the second indication may be performed by, e.g., the vehicle sensor component 198, the ICMS 1540, the sensor(s) 1518, the camera 1532, the transceiver(s) 1522, the cellular baseband processor(s) 1524, and/or the application processor(s) 1506 of the apparatus 1504 in FIG. 15.

In another example, the UE may detect the vehicle is in a parking gear or a stop time of the vehicle exceeds a time threshold; and transmit, to the server, the first information and third information associated with a location of the vehicle based on the detection, such as described in connection with FIGS. 7 and 8. For example, as discussed in connection with 710 and 716 of FIG. 7, a vehicle in the set of vehicles 704 may transmit crowdsourcing data/information 706 that includes a vehicle state (e.g., parked, reverse, neutral, driving, etc.). In another example, the crowdsourcing data/information 706 may include location(s) of a vehicle, such as location(s) where a vehicle is stopped for a defined duration (e.g., stops at least 10 minutes). The detection and/or the transmission may be performed by, e.g., the vehicle sensor component 198, the ICMS 1540, the sensor(s) 1518, the camera 1532, the transceiver(s) 1522, the cellular baseband processor(s) 1524, and/or the application processor(s) 1506 of the apparatus 1504 in FIG. 15.

In another example, the UE may record a set of behavior patterns for at least one occupant in the set of occupants while the vehicle is moving; and transmit, to the server, the set of behavior patterns based on detecting the vehicle is in a parking gear or a stop time of the vehicle exceeds a time threshold, such as described in connection with FIGS. 7 and 8. For example, as discussed in connection with 708 of FIG. 7, a vehicle in the set of vehicles 704 may transmit crowdsourcing data/information 706 that includes identification of occupant(s) in a vehicle and at least one feature associated with at least one occupant. The at least one feature may refer to at least one characteristic of an occupant, such as the age of the occupant (e.g., a newborn/infant 0-12 months, a toddler 1-5 years old, a kid 5-13 years old, a teenager 13-18 old, an adult over 18 years old, etc.), the gender of the occupant (e.g., male, female, etc.), the species of the occupant (e.g., the breed of a dog/cat, etc.), the type of the occupant (e.g., a human, an animal, a non-living object, etc.), the size of the occupant (e.g., small, medium, large, 30-40 kg, 50-70 kg, etc.), a gesture of the occupant (e.g., looking out of the vehicle window frequently), a pattern of the occupant (e.g., stopping the vehicle every X hours), and/or a behavior of the occupant (e.g., changing position frequently, messaging his/her body frequently, exhibiting a sign of fatigue, unbuckling the seatbelt, etc.). The recording of the set of behavior and the transmission of the set of behavior may be performed by, e.g., the vehicle sensor component 198, the ICMS 1540, the sensor(s) 1518, the camera 1532, the transceiver(s) 1522, the cellular baseband processor(s) 1524, and/or the application processor(s) 1506 of the apparatus 1504 in FIG. 15.

In another example, the UE may calculate a duration of the vehicle stops in a location, and the UE may transmit, to the server, the calculated duration of the vehicle stops in the location.

FIG. 14 is a flowchart 1400 of a method of wireless communication. The method may be performed by a UE (e.g., the UE 104, 404, 502, 504, 506, 508, 804; the apparatus 1504). The method may enable the UE provide information related to a set of occupants in a vehicle, and receive a set of recommended stops (e.g., target areas) based on the information.

At 1404, the UE may transmit, to a server, first information related to a set of occupants in a vehicle and at least one feature for at least one occupant in the set of occupants, such as described in connection with FIGS. 7 and 8. For example, at 824 of FIG. 8, the UE 804 may transmit information 806 to the server 702, where information 806 may be related to one or more occupants 808 in a vehicle 810, such as a number of occupants in the vehicle 810, and at least one feature associated with at least one occupant in the one or more occupants 808. The transmission of the first information may be performed by, e.g., the vehicle sensor component 198, the transceiver(s) 1522, the cellular baseband processor(s) 1524, and/or the application processor(s) 1506 of the apparatus 1504 in FIG. 15.

In one example, the set of occupants may include at least one human, at least one animal, or a combination thereof.

In another example, the at least one feature may include: an age of an occupant, a gender of the occupant, a species of the occupant, a size of the occupant, a gesture of the occupant, a pattern of the occupant, a behavior of the occupant, or a combination thereof.

In another example, the UE may be the vehicle, an OBU in the vehicle, or a mobile device.

At 1408, the UE may receive, from the server, an indication of at least one target location in a set of target locations based on the first information and based on second information from crowdsourcing, such as described in connection with FIGS. 7 and 8. For example, at 830 of FIG. 8, the UE 804 may receive an indication 814 to the UE 804 that indicates the at least one stop 812, where the at least one stop 812 is selected based on the information 806 and the crowdsourcing data/information 706. The reception of the indication may be performed by, e.g., the vehicle sensor component 198, the transceiver(s) 1522, the cellular baseband processor(s) 1524, and/or the application processor(s) 1506 of the apparatus 1504 in FIG. 15.

In one example, the set of target locations may include at least one of: a set of stops along a route, where the set of stops include a set of second locations where the vehicle is not moving, or a set of first locations where a speed of the vehicle is less than a threshold speed.

In another example, as shown at 1402, the UE may detect the first information via an ICMS prior to the transmission of the first information, such as described in connection with FIGS. 7 and 8. For example, at 820 of FIG. 8, the UE 804 (e.g., an in-vehicle navigation system, a smartphone that is running a navigation application, etc.) may be configured to detect/identify information 806 related to one or more occupants 808 in a vehicle 810 (e.g., a driver, one or more passengers, one or more animals, one or more objects, etc.), such as a number of occupants in the vehicle 810, and at least one feature associated with at least one occupant in the one or more occupants 808. In some examples, the UE 804 may detect or identify the information 806 related the one or more occupants 808 in the vehicle 810 using an ICMS or at least one sensor (e.g., a camera). The detection of the first information may be performed by, e.g., the vehicle sensor component 198, the ICMS 1540, the sensor(s) 1518, the camera 1532, the transceiver(s) 1522, the cellular baseband processor(s) 1524, and/or the application processor(s) 1506 of the apparatus 1504 in FIG. 15.

In another example, as shown at 1406, the UE may transmit, to the server, a second indication of at least one of: a first number of occupants in the set of occupants, a second number of occupants with an age above or below an age threshold, a behavior pattern of the set of occupants, one or more keywords detected in the vehicle, a speed of the vehicle, a travelling time of the vehicle, an input destination of the vehicle, a previously-stopped location of the vehicle, feedback or a recommendation from the set of occupants, or a combination thereof, where the at least one target location in the set of target locations is further based on the second indication, such as described in connection with FIGS. 7 and 8. For example, as discussed in connection with 824 of FIG. 8, the information 806 may also include additional information that may not be related to the one or more occupants 808, but may enable the server 702 to make more accurate/suitable recommendation for stops. For example, the additional information may include speed of the vehicle (e.g., for the server 702 to determine whether the vehicle 810 is on a freeway and/or the distance that can be travelled by the vehicle 810 in a defined period, etc.), a travelling time of the vehicle 810 (e.g., for the server 702 to estimate when a stop is recommended), an input destination and/or the estimated route of the vehicle (e.g., for the server 702 to choose stop(s) that are along the route to the destination), a previously-stopped location of the vehicle (e.g., for the server 702 to determine when and where of a next-stopped location), a current location of the vehicle 810, feedback or a recommendation from occupants (e.g., for the server 702 to learn occupant(s)' favored options), the ODD description/ICMS specification of the vehicle 810, and/or the vehicle state of the vehicle 810, etc. The transmission of the second indication may be performed by, e.g., the vehicle sensor component 198, the ICMS 1540, the sensor(s) 1518, the camera 1532, the transceiver(s) 1522, the cellular baseband processor(s) 1524, and/or the application processor(s) 1506 of the apparatus 1504 in FIG. 15.

In another example, as shown at 1410, the UE may detect the vehicle is in a parking gear or a stop time of the vehicle exceeds a time threshold; and transmit, to the server, the first information and third information associated with a location of the vehicle based on the detection, such as described in connection with FIGS. 7 and 8. For example, as discussed in connection with 710 and 716 of FIG. 7, a vehicle in the set of vehicles 704 may transmit crowdsourcing data/information 706 that includes a vehicle state (e.g., parked, reverse, neutral, driving, etc.). In another example, the crowdsourcing data/information 706 may include location(s) of a vehicle, such as location(s) where a vehicle is stopped for a defined duration (e.g., stops at least 10 minutes). The detection and/or the transmission may be performed by, e.g., the vehicle sensor component 198, the ICMS 1540, the sensor(s) 1518, the camera 1532, the transceiver(s) 1522, the cellular baseband processor(s) 1524, and/or the application processor(s) 1506 of the apparatus 1504 in FIG. 15.

In another example, as shown at 1412, the UE may record a set of behavior patterns for at least one occupant in the set of occupants while the vehicle is moving; and transmit, to the server, the set of behavior patterns based on detecting the vehicle is in a parking gear or a stop time of the vehicle exceeds a time threshold, such as described in connection with FIGS. 7 and 8. For example, as discussed in connection with 708 of FIG. 7, a vehicle in the set of vehicles 704 may transmit crowdsourcing data/information 706 that includes identification of occupant(s) in a vehicle and at least one feature associated with at least one occupant. The at least one feature may refer to at least one characteristic of an occupant, such as the age of the occupant (e.g., a newborn/infant 0-12 months, a toddler 1-5 years old, a kid 5-13 years old, a teenager 13-18 old, an adult over 18 years old, etc.), the gender of the occupant (e.g., male, female, etc.), the species of the occupant (e.g., the breed of a dog/cat, etc.), the type of the occupant (e.g., a human, an animal, a non-living object, etc.), the size of the occupant (e.g., small, medium, large, 30-40 kg, 50-70 kg, etc.), a gesture of the occupant (e.g., looking out of the vehicle window frequently), a pattern of the occupant (e.g., stopping the vehicle every X hours), and/or a behavior of the occupant (e.g., changing position frequently, messaging his/her body frequently, exhibiting a sign of fatigue, unbuckling the seatbelt, etc.). The recording of the set of behavior and the transmission of the set of behavior may be performed by, e.g., the vehicle sensor component 198, the ICMS 1540, the sensor(s) 1518, the camera 1532, the transceiver(s) 1522, the cellular baseband processor(s) 1524, and/or the application processor(s) 1506 of the apparatus 1504 in FIG. 15.

In another example, the UE may calculate a duration of the vehicle stops in a location, and the UE may transmit, to the server, the calculated duration of the vehicle stops in the location.

Figure 15:
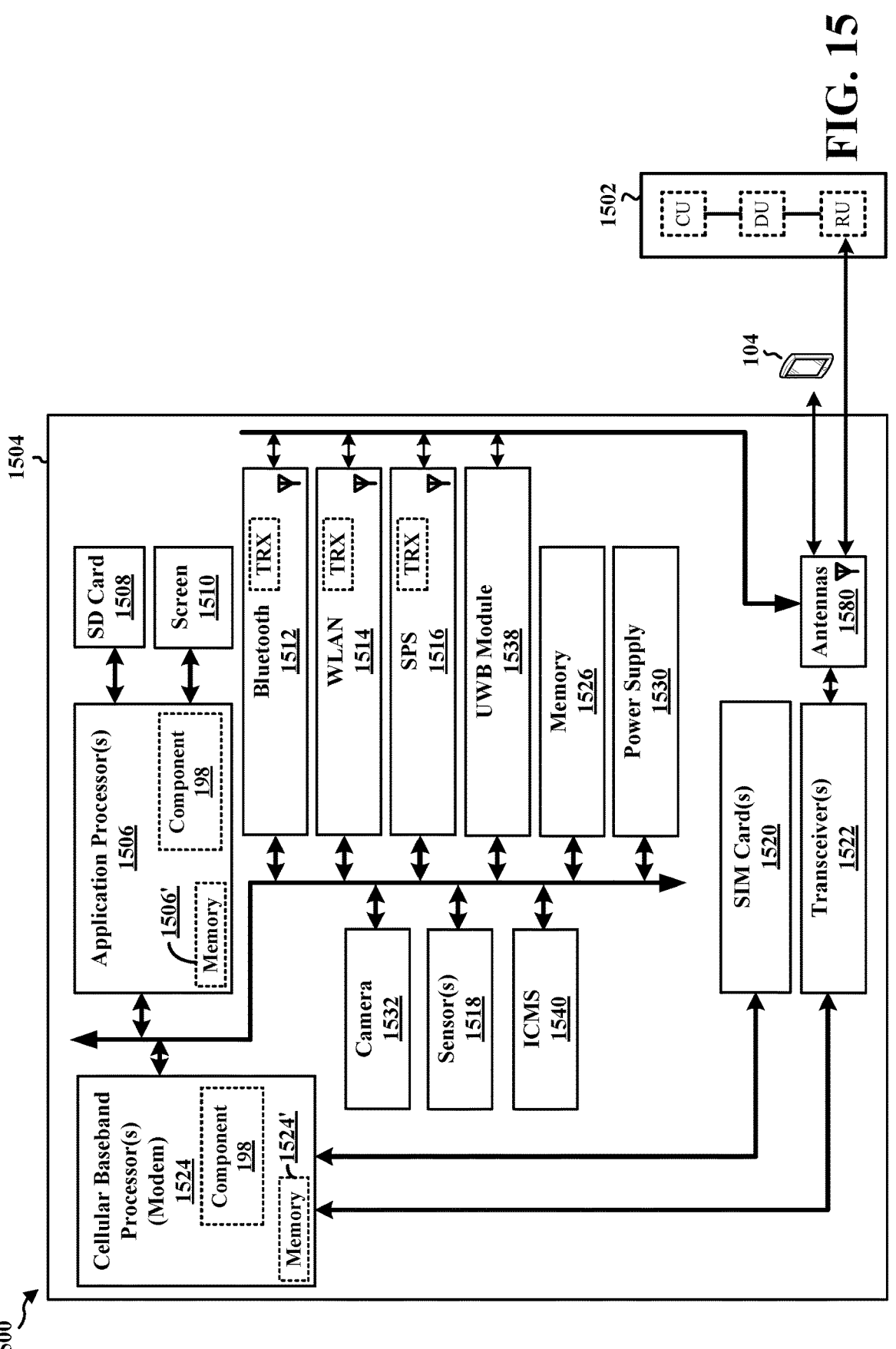
FIG. 15 is a diagram illustrating an example of a hardware implementation for an example apparatus and/or network entity.

FIG. 15 is a diagram 1500 illustrating an example of a hardware implementation for an apparatus 1504. The apparatus 1504 may be a UE, a component of a UE, or may implement UE functionality. In some aspects, the apparatus 1504 may include at least one cellular baseband processor 1524 (also referred to as a modem) coupled to one or more transceivers 1522 (e.g., cellular RF transceiver). The cellular baseband processor(s) 1524 may include at least one on-chip memory 1524'. In some aspects, the apparatus 1504 may further include one or more subscriber identity modules (SIM) cards 1520 and at least one application processor 1506 coupled to a secure digital (SD) card 1508 and a screen 1510. The application processor(s) 1506 may include on-chip memory 1506'. In some aspects, the apparatus 1504 may further include a Bluetooth module 1512, a WLAN module 1514, an ultrawide band (UWB) module 1538, an ICMS 1540, an SPS module 1516 (e.g., GNSS module), one or more sensors 1518 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1526, a power supply 1530, and/or a camera 1532. The Bluetooth module 1512, the UWB module 1538, the ICMS 1540, the WLAN module 1514, and the SPS module 1516 may include an on-chip transceiver (TRX) (or in some cases, just a receiver (RX)). The Bluetooth module 1512, the WLAN module 1514, and the SPS module 1516 may include their own dedicated antennas and/or utilize the antennas 1580 for communication. The cellular baseband processor(s) 1524 communicates through the transceiver(s) 1522 via one or more antennas 1580 with the UE 104 and/or with an RU associated with a network entity 1502. The cellular baseband processor(s) 1524 and the application processor(s) 1506 may each include a computer-readable medium/memory 1524', 1506', respectively. The additional memory modules 1526 may also be considered a computer-readable medium/memory. Each computer-readable medium/memory 1524', 1506', 1526 may be non-transitory. The cellular baseband processor(s) 1524 and the application processor(s) 1506 are each responsible for general processing, including the execution of software stored on the computer-readable medium/memory. The software, when executed by the cellular baseband processor(s) 1524/application processor(s) 1506, causes the cellular baseband processor(s) 1524/application processor(s) 1506 to perform the various functions described supra. The cellular baseband processor(s) 1524 and the application processor(s) 1506 are configured to perform the various functions described supra based at least in part of the information stored in the memory. That is, the cellular baseband processor(s) 1524 and the application processor(s) 1506 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1524/application processor(s) 1506 when executing software. The cellular baseband processor(s) 1524/application processor(s) 1506 may be a component of the UE 350 and may include the at least one memory 360 and/or at least one of the TX processor 368, the RX processor 356, and the controller/processor 359. In one configuration, the apparatus 1504 may be at least one processor chip (modem and/or application) and include just the cellular baseband processor(s) 1524 and/or the application processor(s) 1506, and in another configuration, the apparatus 1504 may be the entire UE (e.g., see UE 350 of FIG. 3) and include the additional modules of the apparatus 1504.

As discussed supra, the vehicle sensor component 198 may be configured to transmit, to a server, first information related to a set of occupants in a vehicle and at least one feature for at least one occupant in the set of occupants. The vehicle sensor component 198 may also be configured to receive, from the server, an indication of at least one target location in a set of target locations based on the first information and based on second information from crowd-sourcing. The vehicle sensor component 198 may be within the cellular baseband processor(s) 1524, the application processor(s) 1506, or both the cellular baseband processor(s) 1524 and the application processor(s) 1506. The vehicle sensor component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1504 may include a variety of components configured for various functions. In one configuration, the apparatus 1504, and in particular the cellular baseband processor(s) 1524 and/or the application processor(s) 1506, may include means for transmitting, to a server, first information related to a set of occupants in a vehicle and at least one feature for at least one occupant in the set of occupants. The apparatus 1504 may further include means for receiving, from the server, an indication of at least one target location in a set of target locations based on the first information and based on second information from crowdsourcing.

In one configuration, the set of occupants may include at least one human, at least one animal, or a combination thereof.

In another configuration, the at least one feature may include: an age of an occupant, a gender of the occupant, a species of the occupant, a size of the occupant, a gesture of the occupant, a pattern of the occupant, a behavior of the occupant, or a combination thereof.

In another configuration, the apparatus 1504 may be the vehicle, an OBU in the vehicle, or a mobile device.

In another configuration, the set of target locations may include at least one of: a set of stops along a route, where the set of stops include a set of second locations where the vehicle is not moving, or a set of first locations where a speed of the vehicle is less than a threshold speed.

In another configuration, the apparatus 1504 may further include means for detecting the first information via an ICMS prior to the transmission of the first information.

In another configuration, the apparatus 1504 may further include means for transmitting, to the server, a second indication of at least one of: a first number of occupants in the set of occupants, a second number of occupants with an age above or below an age threshold, a behavior pattern of the set of occupants, one or more keywords detected in the vehicle, a speed of the vehicle, a travelling time of the vehicle, an input destination of the vehicle, a previously-stopped location of the vehicle, feedback or a recommendation from the set of occupants, or a combination thereof, where the at least one target location in the set of target locations is further based on the second indication.

In another configuration, the apparatus 1504 may further include means for detecting the vehicle is in a parking gear or a stop time of the vehicle exceeds a time threshold; and means for transmitting, to the server, the first information and third information associated with a location of the vehicle based on the detection.

In another configuration, the apparatus 1504 may further include means for recording a set of behavior patterns for at least one occupant in the set of occupants while the vehicle is moving; and means for transmitting, to the server, the set of behavior patterns based on detecting the vehicle is in a parking gear or a stop time of the vehicle exceeds a time threshold.

In another configuration, the apparatus 1504 may further include means for calculating a duration of the vehicle stops in a location, and means for transmitting, to the server, the calculated duration of the vehicle stops in the location.

The means may be the vehicle sensor component 198 of the apparatus 1504 configured to perform the functions recited by the means. As described supra, the apparatus 1504 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a server, comprising: receiving, from a user equipment (UE), first information related to a set of occupants in a vehicle and at least one feature for at least one occupant in the set of occupants; calculating, based on the first information, a probability that a route for the vehicle includes a set of target locations; selecting at least one target location based on the first information; and transmitting, to the UE, an indication of the selected at least one target location.

Aspect 2 is the method of aspect 1, wherein the set of occupants includes at least one human, at least one animal, or a combination thereof.

Aspect 3 is the method of aspect 1 or aspect 2, wherein the at least one feature includes: an age of an occupant, a gender of the occupant, a species of the occupant, a size of the occupant, a gesture of the occupant, a pattern of the occupant, a behavior of the occupant, or a combination thereof.

Aspect 4 is the method of any of aspects 1 to 3, wherein receiving the first information comprises receiving the first information via an in-cabin monitoring system (ICMS) associated with the vehicle.

Aspect 5 is the method of any of aspects 1 to 4, further comprising: receiving, from the UE, a second indication of at least one of: a first number of occupants in the set of occupants, a second number of occupants with an age above or below an age threshold, a behavior pattern of the set of occupants, one or more keywords detected in the vehicle, a speed of the vehicle, a travelling time of the vehicle, an input destination of the vehicle, a previously-stopped location of the vehicle, feedback or a recommendation from the set of occupants, or a combination thereof; and wherein the selection of the at least one target location is further based on the second indication.

Aspect 6 is the method of any of aspects 1 to 5, wherein selecting the at least one target location comprises selecting the at least one target location further based on at least one of: a time of day, a first number of occupants in the set of occupants, a second number of occupants with an age above or below an age threshold, a behavior pattern of the set of occupants, one or more keywords detected in the vehicle, a travelling time of the vehicle, an input destination of the vehicle, a previous stopped location of the vehicle, feedback or a recommendation from the set of occupants, or a speed of the vehicle.

Aspect 7 is the method of any of aspects 1 to 6, wherein the UE is the vehicle, an on-board unit (OBU) in the vehicle, or a mobile device.

Aspect 8 is the method of any of aspects 1 to 7, further comprising: obtain second information based on crowdsourcing prior to the selection of the at least one target location, wherein selecting the at least one target location comprises selecting the at least one target location further based on the second information.

Aspect 9 is the method of any of aspects 1 to 8, wherein obtaining the second information based on the crowdsourcing comprises: collecting, from each UE in a set of UEs, third information related to a second set of occupants in a second vehicle and at least one second feature for at least one occupant in the second set of occupants.

Aspect 10 is the method of any of aspects 1 to 9, further comprising: calculating, based on the first information, a probability that a route for the vehicle includes a set of target locations, wherein selecting the at least one target location based on the first information comprises selecting, based on the probability being greater than a threshold probability, the at least one target location in the set of target locations based on the first information.

Aspect 11 is the method of any of aspects 1 to 10, wherein the set of target locations includes at least one of: a set of stops along the route, wherein the set of stops includes a set of second locations where the vehicle is not moving, or a set of first locations where a speed of the vehicle is less than a threshold speed.

Aspect 12 is the method of any of aspects 1 to 11, wherein calculating the probability that the route for the vehicle includes the set of target locations comprises detecting that at least one occupant in the set of occupants is exhibiting a defined sign or a defined pattern associated with seeking the set of first locations or the set of stops.

Aspect 13 is the method of any of aspects 1 to 12, wherein the calculation of the probability that the route for the vehicle includes the set of target locations is further based on at least one of: a time of day, second information from crowdsourcing, or a combination thereof.

Aspect 14 is an apparatus for wireless communication at a server, including: at least one memory; and at least one processor coupled to the at least one memory and, based at least in part on information stored in the at least one memory, the at least one processor, individually or in any combination, is configured to implement any of aspects 1 to 13.

Aspect 15 is the apparatus of aspect 14, further including at least one of a transceiver or an antenna coupled to the at least one processor.

Aspect 16 is an apparatus for wireless communication including means for implementing any of aspects 1 to 13.

Aspect 17 is a computer-readable medium (e.g., a non-transitory computer-readable medium) storing computer executable code, where the code when executed by a processor causes the processor to implement any of aspects 1 to 13.

Aspect 18 is a method of wireless communication at a user equipment (UE), comprising: transmitting, to a server, first information related to a set of occupants in a vehicle and at least one feature for at least one occupant in the set of occupants; and receiving, from the server, an indication of at least one target location in a set of target locations based on the first information and based on second information from crowdsourcing.

Aspect 19 is the method of aspect 18, wherein the set of target locations includes at least one of: a set of stops along a route, wherein the set of stops include a set of second locations where the vehicle is not moving, or a set of first locations where a speed of the vehicle is less than a threshold speed.

Aspect 20 is the method of aspect 18 or aspect 19, wherein the set of occupants includes at least one human, at least one animal, or a combination thereof.

Aspect 21 is the method of any of aspects 18 to 20, wherein the at least one feature includes: an age of an occupant, a gender of the occupant, a species of the occupant, a size of the occupant, a gesture of the occupant, a pattern of the occupant, a behavior of the occupant, or a combination thereof.

Aspect 22 is the method of any of aspects 18 to 21, further comprising: detecting the first information via an in-cabin monitoring system (ICMS) prior to the transmission of the first information.

Aspect 23 is the method of any of aspects 18 to 22, further comprising: transmitting, to the server, a second indication of at least one of: a first number of occupants in the set of occupants, a second number of occupants with an age above or below an age threshold, a behavior pattern of the set of occupants, one or more keywords detected in the vehicle, a speed of the vehicle, a travelling time of the vehicle, an input destination of the vehicle, a previously-stopped location of the vehicle, feedback or a recommendation from the set of occupants, or a combination thereof; and wherein the at least one target location in the set of target locations is further based on the second indication.

Aspect 24 is the method of any of aspects 18 to 23, wherein the UE is the vehicle, an on-board unit (OBU) in the vehicle, or a mobile device.

Aspect 25 is the method of any of aspects 18 to 24, further comprising: detecting the vehicle is in a parking gear or a stop time of the vehicle exceeds a time threshold; and transmitting, to the server, the first information and third information associated with a location of the vehicle based on the detection.

Aspect 26 is the method of any of aspects 18 to 25, further comprising: recording a set of behavior patterns for at least one occupant in the set of occupants while the vehicle is moving; and transmitting, to the server, the set of behavior patterns based on detecting the vehicle is in a parking gear or a stop time of the vehicle exceeds a time threshold.

Aspect 27 is the method of any of aspects 18 to 26, further comprising: calculating a duration of the vehicle stops in a location; and transmitting, to the server, the calculated duration of the vehicle stops in the location.

Aspect 28 is an apparatus for wireless communication at a user equipment (UE), including: at least one memory; and at least one processor coupled to the at least one memory and, based at least in part on information stored in the at least one memory, the at least one processor, individually or in any combination, is configured to implement any of aspects 18 to 27.

Aspect 29 is the apparatus of aspect 28, further including at least one of a transceiver or an antenna coupled to the at least one processor.

Aspect 30 is an apparatus for wireless communication including means for implementing any of aspects 18 to 27.

Aspect 31 is a computer-readable medium (e.g., a non-transitory computer-readable medium) storing computer executable code, where the code when executed by a processor causes the processor to implement any of aspects 18 to 27.

What is claimed is:

1. An apparatus for wireless communication at a server, comprising:
   at least one memory;
   at least one network interface; and
   at least one processor coupled to the at least one memory and the at least one network interface, the at least one processor, individually or in any combination, is configured to:
      receive, from a user equipment (UE) via the at least one network interface, first information related to a set of occupants in a vehicle and at least one feature for at least one occupant in the set of occupants;
      calculate, based on the first information, a probability of whether the at least one occupant specifies at least one stop within a specified time frame or before reaching a destination;
      collect, from each UE in a set of UEs, second information related to a second set of occupants in a second vehicle and at least one second feature for at least one occupant in the second set of occupants;
      select at least one target location based on (1) the probability being greater than a threshold probability, (2) the first information, and (3) the second information; and
      transmit, to the UE via the at least one network interface, an indication of the selected at least one target location.

2. The apparatus of claim 1, wherein the set of occupants includes at least one human, at least one animal, or a combination thereof.

3. The apparatus of claim 1, wherein the at least one feature includes:

an age of an occupant, a gender of the occupant, a species of the occupant, a size of the occupant, a gesture of the occupant, a pattern of the occupant, a behavior of the occupant, or a combination thereof.

4. The apparatus of claim 1, wherein to receive the first information, the at least one processor, individually or in any combination, is configured to:

receive the first information via an in-cabin monitoring system (ICMS) associated with the vehicle.

5. The apparatus of claim 1, wherein the at least one processor, individually or in any combination, is further configured to:

receive, from the UE, a second indication of at least one of:

a first number of occupants in the set of occupants, a second number of occupants with an age above or below an age threshold, a behavior pattern of the set of occupants, one or more keywords detected in the vehicle, a speed of the vehicle, a travelling time of the vehicle, an input destination of the vehicle, a previously-stopped location of the vehicle, feedback or a recommendation from the set of occupants, or a combination thereof; and wherein the selection of the at least one target location is further based on the second indication.

6. The apparatus of claim 1, wherein to select the at least one target location, the at least one processor, individually or in any combination, is configured to:

select the at least one target location further based on at least one of:

a time of day, a first number of occupants in the set of occupants, a second number of occupants with an age above or below an age threshold, a behavior pattern of the set of occupants, one or more keywords detected in the vehicle, a travelling time of the vehicle, an input destination of the vehicle, a previous stopped location of the vehicle, feedback or a recommendation from the set of occupants, or a speed of the vehicle.

7. The apparatus of claim 1, wherein the UE is the vehicle, an on-board unit (OBU) in the vehicle, or a mobile device.

8. The apparatus of claim 1, wherein the at least one processor, individually or in any combination, is further configured to calculate, based on the first information, a second probability that a route for the vehicle includes a set of target locations, wherein to select the at least one target location based on the first information, the at least one processor, individually or in any combination, is configured to select, based on the second probability being greater than a second threshold probability, the at least one target location in the set of target locations based on the first information.

9. The apparatus of claim 8, wherein the set of target locations includes at least one of:

a set of stops along the route, wherein the set of stops includes a set of second locations where the vehicle is not moving, or a set of first locations where a speed of the vehicle is less than a threshold speed.

10. The apparatus of claim 9, wherein to calculate the second probability that the route for the vehicle includes the set of target locations, the at least one processor, individually or in any combination, is configured to:

detect that the at least one occupant in the set of occupants is exhibiting a defined sign or a defined pattern associated with seeking the set of first locations or the set of stops.

11. The apparatus of claim 8, wherein the calculation of the second probability that the route for the vehicle includes the set of target locations is further based on at least one of:

a time of day, the second information, or a combination thereof.

12. A method of wireless communication at a server, comprising:

receiving, from a user equipment (UE) via at least one network interface, first information related to a set of occupants in a vehicle and at least one feature for at least one occupant in the set of occupants;

calculating, based on the first information, a probability of whether the at least one occupant specifies at least one stop within a specified time frame or before reaching a destination;

collecting, from each UE in a set of UEs, second information related to a second set of occupants in a second vehicle and at least one second feature for at least one occupant in the second set of occupants;

selecting at least one target location based on (1) the probability being greater than a threshold probability, (2) the first information, and (3) the second information; and transmitting, to the UE via the at least one network interface, an indication of the selected at least one target location.

13. The method of claim 12, further comprising:

receiving, from the UE, a second indication of at least one of:

a first number of occupants in the set of occupants, a second number of occupants with an age above or below an age threshold, a behavior pattern of the set of occupants, one or more keywords detected in the vehicle, a speed of the vehicle, a travelling time of the vehicle, an input destination of the vehicle, a previously-stopped location of the vehicle, feedback or a recommendation from the set of occupants, or a combination thereof; and wherein the selection of the at least one target location is further based on the second indication.

14. The method of claim 12, wherein selecting the at least one target location comprises selecting the at least one target location further based on at least one of:

a time of day, a first number of occupants in the set of occupants, a second number of occupants with an age above or below an age threshold, a behavior pattern of the set of occupants, one or more keywords detected in the vehicle, a travelling time of the vehicle, an input destination of the vehicle,
a previous stopped location of the vehicle,
feedback or a recommendation from the set of occupants, or
a speed of the vehicle.

15. An apparatus for wireless communication at a user equipment (UE), comprising:
at least one memory; and
at least one processor coupled to the at least one memory, the at least one processor, individually or in any combination, is configured to:
transmit, to a server, first information related to a set of occupants in a vehicle and at least one feature for at least one occupant in the set of occupants; and
receive, from the server, an indication of at least one target location in a set of target locations based on a probability of the at least one occupant specifies at least one stop within a specified time frame or before reaching a destination and based on second information from crowdsourcing, wherein the probability is based on the first information, wherein the second information is based on one or more vehicles with the at least one feature for at least one occupant in the one or more vehicles.

16. The apparatus of claim 15, wherein the set of target locations includes at least one of:
a set of stops along a route, wherein the set of stops include a set of second locations where the vehicle is not moving, or
a set of first locations where a speed of the vehicle is less than a threshold speed.

17. The apparatus of claim 15, wherein the set of occupants includes at least one human, at least one animal, or a combination thereof.

18. The apparatus of claim 15, wherein the at least one feature includes:
an age of an occupant,
a gender of the occupant,
a species of the occupant,
a size of the occupant,
a gesture of the occupant,
a pattern of the occupant,
a behavior of the occupant, or
a combination thereof.

19. The apparatus of claim 15, wherein the at least one processor, individually or in any combination, is further configured to:
detect the first information via an in-cabin monitoring system (ICMS) prior to the transmission of the first information.

20. The apparatus of claim 15, wherein the at least one processor, individually or in any combination, is further configured to:
transmit, to the server, a second indication of at least one of:
a first number of occupants in the set of occupants,
a second number of occupants with an age above or below an age threshold,
a behavior pattern of the set of occupants,
one or more keywords detected in the vehicle,
a speed of the vehicle,
a travelling time of the vehicle,
an input destination of the vehicle,
a previously-stopped location of the vehicle,
feedback or a recommendation from the set of occupants, or
a combination thereof; and wherein the at least one target location in the set of target locations is further based on the second indication.

21. The apparatus of claim 15, wherein the UE is the vehicle, an on-board unit (OBU) in the vehicle, or a mobile device.

22. The apparatus of claim 15, wherein the at least one processor, individually or in any combination, is further configured to:
detect the vehicle is in a parking gear or a stop time of the vehicle exceeds a time threshold; and
transmit, to the server, the first information and third information associated with a location of the vehicle based on the detection.

23. The apparatus of claim 15, wherein the at least one processor, individually or in any combination, is further configured to:
record a set of behavior patterns for at least one occupant in the set of occupants while the vehicle is moving; and
transmit, to the server, the set of behavior patterns based on detecting the vehicle is in a parking gear or a stop time of the vehicle exceeds a time threshold.

24. The apparatus of claim 15, wherein the at least one processor, individually or in any combination, is further configured to:
calculate a duration of the vehicle stops in a location; and
transmit, to the server, the calculated duration of the vehicle stops in the location.

25. The apparatus of claim 15, further comprising at least one of a transceiver or an antenna coupled to the at least one processor, wherein to receive the indication of the at least one target location, the at least one processor, individually or in any combination, is configured to receive, from the server via at least one of the transceiver or the antenna, the indication of the at least one target location.

26. A method of wireless communication at a user equipment (UE), comprising:
transmitting, to a server, first information related to a set of occupants in a vehicle and at least one feature for at least one occupant in the set of occupants; and
receiving, from the server, an indication of at least one target location in a set of target locations based on a probability of the at least one occupant specifies at least one stop within a specified time frame or before reaching a destination and based on second information from crowdsourcing, wherein the probability is based on the first information, wherein the second information is based on one or more vehicles with the at least one feature for at least one occupant in the one or more vehicles.

27. The method of claim 26, further comprising:
transmitting, to the server, a second indication of at least one of:
a first number of occupants in the set of occupants,
a second number of occupants with an age above or below an age threshold,
a behavior pattern of the set of occupants,
one or more keywords detected in the vehicle,
a speed of the vehicle,
a travelling time of the vehicle,
an input destination of the vehicle,
a previously-stopped location of the vehicle,
feedback or a recommendation from the set of occupants, or
a combination thereof; and
wherein the at least one target location in the set of target locations is further based on the second indication.

28. The method of claim 26, further comprising:

detecting the vehicle is in a parking gear or a stop time of the vehicle exceeds a time threshold; and transmitting, to the server, the first information and third information associated with a location of the vehicle based on the detection.

* * * * *